(12) United States Patent
Ravishankar et al.

(10) Patent No.: US 10,177,837 B2
(45) Date of Patent: Jan. 8, 2019

(54) APPROACHES FOR HIGH SPEED GLOBAL PACKET DATA SERVICES FOR LEO/MEO SATELLITE SYSTEMS

(71) Applicant: Hughes Network Systems, LLC, Germantown, MD (US)

(72) Inventors: Channasandra Ravishankar, Clarksburg, MD (US); John Corrigan, Chevy Chase, MD (US); Rajeev Gopal, North Potomac, MD (US); Yash Vasavada, Gaithersburg, MD (US); James Jehong Jong, North Potomac, MD (US); Nassir Benammar, Rockville, MD (US); Gaguk Zakaria, College Park, MD (US); Anthony Noerpel, Lovettsville, VA (US); Harish Ramchandran, Germantown, MD (US); Xiaoling Huang, Boyds, MD (US); Deepak Arur, Vienna, VA (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/186,417

(22) Filed: Jun. 17, 2016

(65) Prior Publication Data

US 2017/0366251 A1 Dec. 21, 2017
US 2018/0316414 A9 Nov. 1, 2018

Related U.S. Application Data

(60) Provisional application No. 62/181,062, filed on Jun. 17, 2015.

(51) Int. Cl.
*H04B 7/185* (2006.01)
*H04W 84/06* (2009.01)

(52) U.S. Cl.
CPC ..... *H04B 7/18513* (2013.01); *H04B 7/18584* (2013.01); *H04W 84/06* (2013.01)

(58) Field of Classification Search
None
See application file for complete search history.

(56) References Cited

U.S. PATENT DOCUMENTS 6,442,147 B1 8/2002 Mauger et al.
6,542,739 B1 4/2003 Garner
(Continued)

OTHER PUBLICATIONS

C. Ravishankar et al., "Design and Performance of a 3G Mobile Satellite System", 2011 Military Communications Conference, all pages.*

(Continued)

*Primary Examiner* — Chirag G Shah
*Assistant Examiner* — Srinivasa R Reddivalam
(74) *Attorney, Agent, or Firm* — Potomac Technology Law, LLC

(57) ABSTRACT

A satellite system comprises LEO satellites and MEO satellites, and a control plane protocol architecture. The PHY, MAC, MAC/RLC and RRC layers are optimized for satellite environment. When the satellites are not processing satellites, eNB functions are implemented in a satellite gateway, and, when the satellites are processing satellites, protocol architecture in the control plane differ from LTE, as follows: PHY layer is moved to the communicating LEO/MEO satellite on the user link, MAC/RLC, RRC and PDCP are be located in satellite or gateway depending on satellite complexity, and the need to have mesh connectivity between UTs. When the RRC is implemented in the satellite, the RRC is divided into RRC-Lower and RRC-Upper layers. The RRC-L is satellite-based, and handles UT handover. The RRC-U is eNB-based, and handles resource management (Continued)

functions. The RRC-U communicates with the PDCP layer in the eNB to configure security, header and data compression.

1 Claim, 43 Drawing Sheets

(56) References Cited

U.S. PATENT DOCUMENTS

| | | |
|---|---|---|
| 2004/0024791 A1 | 2/2004 | Martin et al. |
| 2007/0252765 A1 | 11/2007 | Jayasuriya et al. |
| 2013/0217422 A1* | 8/2013 | Zakaria .............. H04B 7/18539 455/458 |
| 2013/0232565 A1 | 9/2013 | O'Connor et al. |
| 2013/0321206 A1 | 12/2013 | Chang |
| 2014/0022983 A1* | 1/2014 | Ravishankar ...... H04B 7/18563 370/316 |
| 2014/0198709 A1 | 7/2014 | Chang |
| 2015/0024677 A1* | 1/2015 | Gopal .................. H04B 7/2041 455/13.1 |
| 2015/0052360 A1* | 2/2015 | Ravishankar ....... H04L 63/0428 713/171 |
| 2015/0280810 A1 | 10/2015 | Beals et al. |
| 2016/0006500 A1* | 1/2016 | Radpour ............ H04B 7/18539 370/319 |

OTHER PUBLICATIONS

USPTO, "International Search Report & Written Opinion", PCT/US2016/038260, dated Sep. 28, 2016.

* cited by examiner

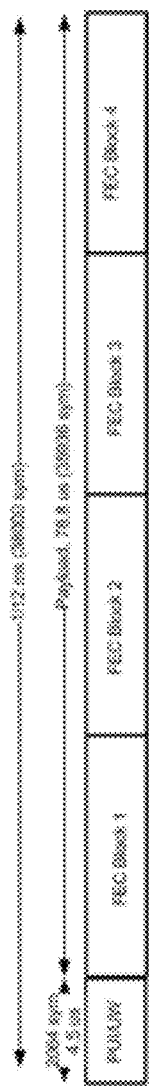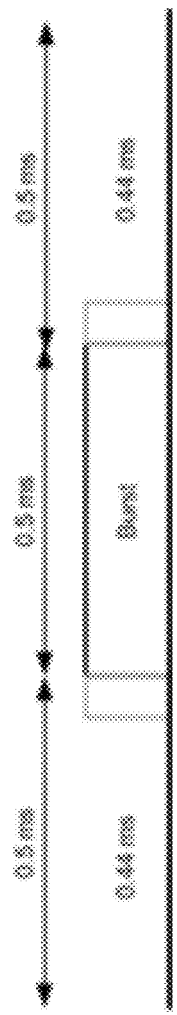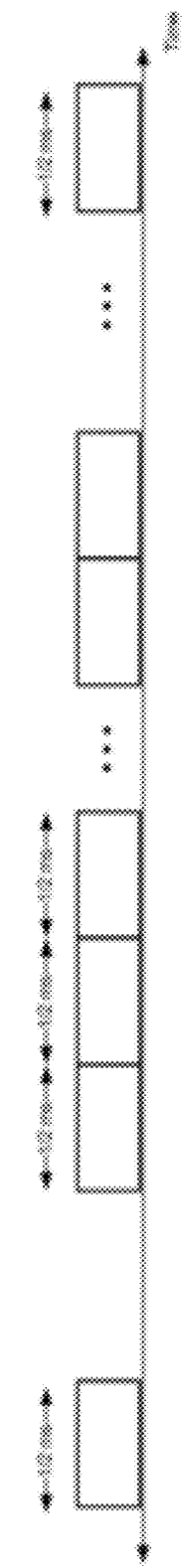

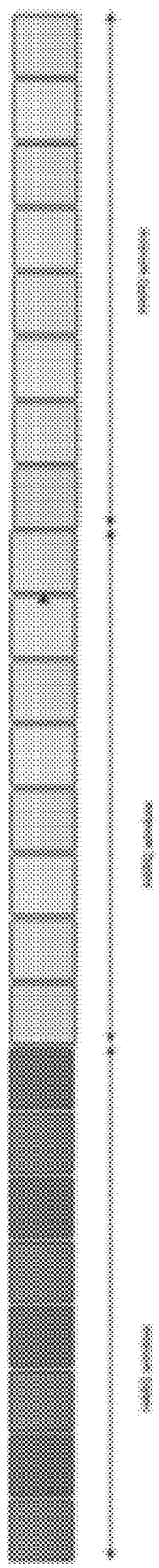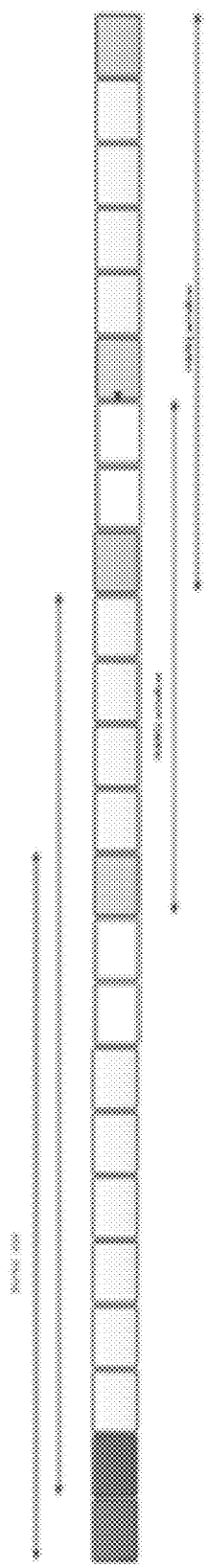
FIG. 4D
FIG. 4E

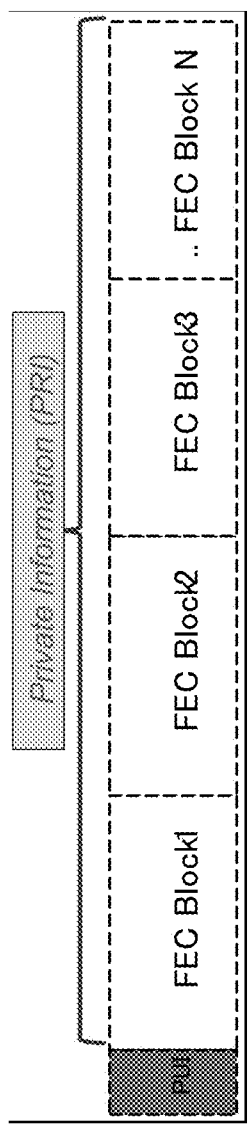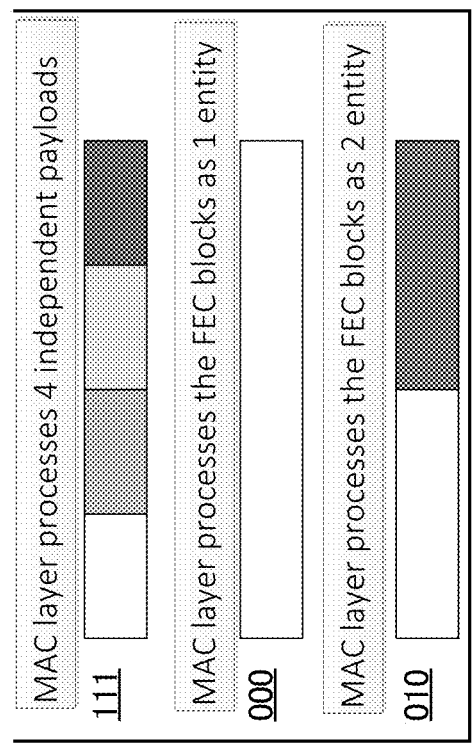

APPROACHES FOR HIGH SPEED GLOBAL PACKET DATA SERVICES FOR LEO/MEO SATELLITE SYSTEMS

RELATED APPLICATIONS

This application claims the benefit of the earlier filing date under 35 U.S.C. § 119(e) from U.S. Provisional Application Ser. No. 62/181,062 (filed 2015 Jun. 17), which is incorporated herein by reference herein in its entirety.

BACKGROUND

Terrestrial communication systems continue to provide higher and higher speed multimedia (e.g., voice, data, video, images, etc.) services to end-users. Such services (e.g., Third Generation (3G) and Fourth Generation Long Term Evolution (4G LTE) systems and services) can also accommodate differentiated quality of service (QoS) across various applications. To facilitate this, terrestrial architectures are moving towards an end-to-end all-Internet Protocol (IP) architecture that unifies all services, including voice, over the IP bearer. In parallel, mobile satellite systems are being designed to complement and/or coexist with terrestrial coverage depending on spectrum sharing rules and operator choice. With the advances in processing power of portable computers, mobile phones and other highly portable devices, the average user has grown accustomed to sophisticated applications (e.g., streaming video, radio broadcasts, video games, etc.), which place tremendous strain on network resources. Further, such users have grown to expect ubiquitous global coverage. The Web as well as other Internet services rely on protocols and networking architectures that offer great flexibility and robustness; however, such infrastructure may be inefficient in transporting Web traffic, which can result in large user response time, particularly if the traffic has to traverse an intermediary network with a relatively large latency (e.g., a satellite network). Such high mobility, enhanced processing power of devices, and growth of low-latency applications, however, puts an immense strain on current terrestrial and satellite communications systems.

What is needed, therefore, is an approach for a low earth orbit (LEO)/medium earth orbit (MEO) multi-satellite communications system for efficiently providing high speed and high quality packet data services.

SOME EXAMPLE EMBODIMENTS

Embodiments of the present invention advantageously address the foregoing requirements and needs, as well as others, by providing an approach for providing high speed and high quality packet data services via a LEO/MEO satellite system. The LEO/MEO satellites may be processing satellites. When LEO/MEO satellites are processing satellites, IP packets and Layer 2 frames transmitted by user terminals are recovered at the satellite and transmitted on the gateway links and/or inter-satellite links. Similarly, in the direction from network to user terminal, IP packets and Layer 2 frames transmitted by gateways are recovered at the satellite and transmitted on the user links. The frequency and format of transmission on gateway and user links may be different. In addition, the transmission to and from user terminal on a user link may be different. Similarly, the transmission to and from gateway on a gateway link may be different. The architecture also permits transmission from user terminal to another user terminal directly without traversing through a gateway. Similarly, the architecture permits direct gateway to gateway communication via the satellite constellation. When LEO/MEO satellites are not processing satellites (i.e., they are bent-pipe satellites), communication is directly between user terminal and gateway with a frequency translation between gateway links and user links.

In accordance with example embodiments, an overall network architecture is shown in FIG. 1. The user terminal (UT) may be in one of a multiplicity of beams in the user link. Satellites, and therefore beams corresponding those satellites move (for satellite-fixed beams) over the user terminal as the LEO/MEO constellation moves even if the user terminal is not moving. Accordingly, beam-to-beam and satellite-to-satellite handover are required in this scenario. User terminals are typically equipped with a tracking antenna that is preferably electronically steered. However, the design does not preclude terminals using mechanical steering. In another embodiment, the satellite attempts to steer its antenna such that beams remain in the same place on the earth surface (also called earth-fixed beams). In this case, there is no need for beam-to-beam handover. The system also supports gateway to gateway handover to cater to cases where a user terminal may be in motion and it crosses from one gateway region to another. Gateway to Gateway handover would also be necessary when a Gateway fails or when the capacity of the gateway is such that it cannot accept any additional sessions. As part of the above mentioned beam-to-beam, satellite-to-satellite and gateway-to-gateway handovers, frequency handovers occur in a multiple frequency reuse system. To this end, the system design also supports frequency handover even when there is no beam-to-beam, satellite-to-satellite and gateway-to-gateway handovers; this will be the case when a frequency is deemed unusable due to interference and/or when it is required to move a terminal to a different frequency for resource usage efficiency issues and for services such as IP multicast.

Certain system features are as follows:
Powerful FEC coding, near theoretical channel performance;
Adaptive Coding & Modulation (ACM) improves throughput every channel condition;
Power-conserving design reduces power to enable battery/solar powered user terminal (sleep/wake paging cycle);
MAC layer design for efficient Bandwidth-on-Demand;
Support for Small and Large terminal types as well as fixed and mobile terminal types including Aeronautical and Maritime terminals;
Quality-of-Service (QoS) support for multiple service types;
Simplified satellite design to minimize technical and costs risks;
Simplified routing/switching function in the satellite using a centralized route determination function in each gateway that determines optimal routes. This removes the burden for satellite to be dynamically figuring out the routes;
Mobility Management functions enable beam, satellite, gateway and frequency handovers;
Scalable Gateway architecture to cater to different throughputs and different number of LEO/MEO satellites that it would need to communicate with;
Standard wireless and network protocols to utilize commercial implementations and evolution;

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which:

FIG. 4A illustrates a physical layer burst, according to example embodiments;

FIG. 4B illustrates a return link RACH window, according to example embodiments;

FIG. 4C illustrates an example of control messages (such as RACH and traffic) multiplexed on the same narrowband carrier, according to example embodiments;

FIG. 4D illustrates an example of synchronous HARQ signaling, according to example embodiments;

FIG. 4E illustrates an example of hybrid HARQ signaling, according to example embodiments;

FIG. 9 illustrates an example MAC layer downlink burst and public information (PUI), according to example embodiments;

FIG. 10 illustrates an example MAC layer block boundary encoding, according to example embodiments;

DETAILED DESCRIPTION

Figure 1:
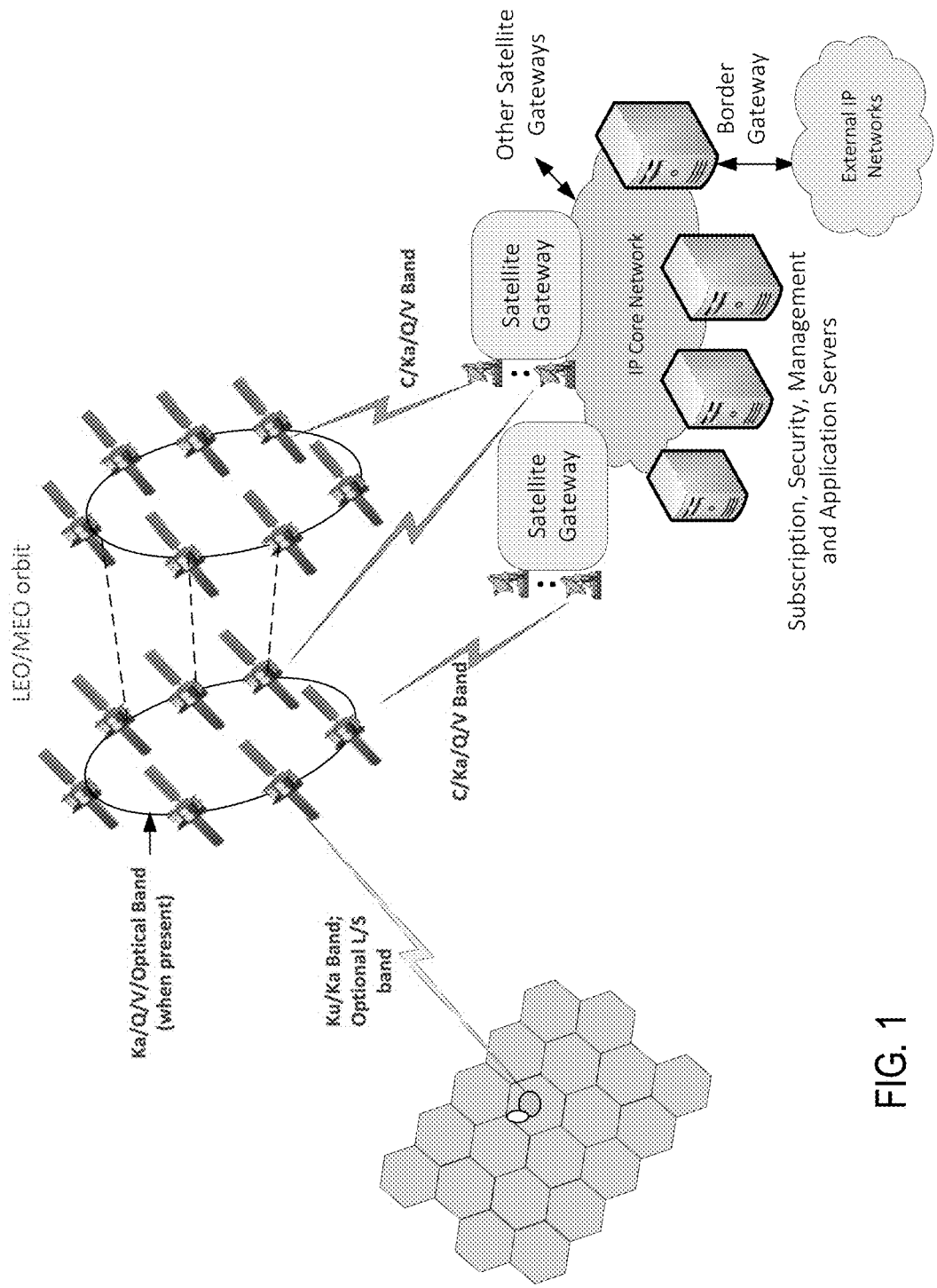
FIG. 1 illustrates the high-level architecture of a low earth orbit (LEO)/medium earth orbit (MEO) satellite system, according to example embodiments.

System architectures and associated processes for providing high speed and high quality packet data services via a LEO/MEO satellite system are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Architecture

FIG. 1 illustrates the high-level architecture of a low earth orbit (LEO)/medium earth orbit (MEO) satellite system, according to example embodiments. As illustrated by FIG. 1, the Ku band in user-link and V/Q band in Gateway link as examples. Other frequencies that are mutually exclusive may also be used in Gateway link and user links. As further shown in FIG. 1, Satellite Gateways are connected via terrestrial links or via the existing LEO/MEO satellite constellation or via a GEO satellite system. IP Core network resembles that of a classical 4G-LTE network with the Border Gateway playing the role of PDN-Gateway (PGW) of LTE core network. Other elements that have a correspondence to 4G LTE core network include Subscription server (equivalent to the Home Subscription Server—HSS), Management Server (equivalent of MME) and Security Server (equivalent to AuC). Although the Serving Gateway (SGW) is not explicitly shown, it is expected to be part of the Satellite Gateway and/or PGW.

Figure 2A:
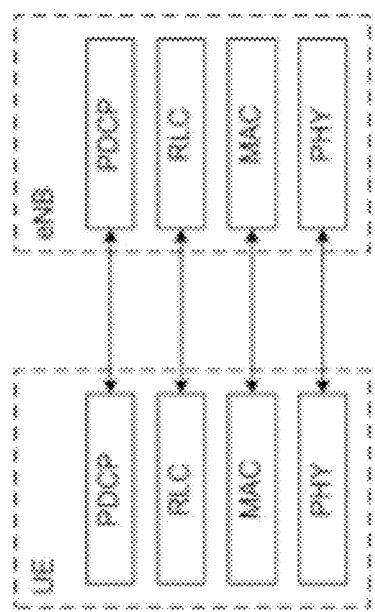
FIG. 2A illustrates the user plane protocol architecture of a 4G long-term evolution (LTE) terrestrial system.
Figure 2B:
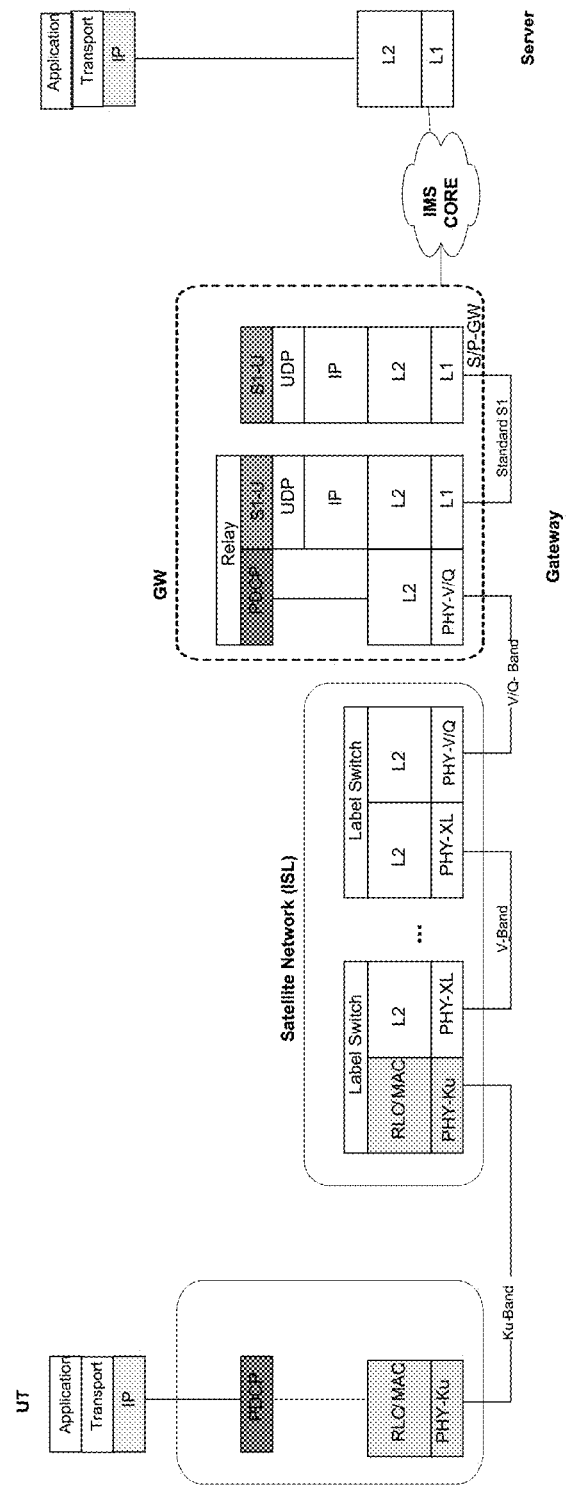
FIG. 2B illustrates the user plane protocol architecture for a LEO/MEO satellite system, according to example embodiments.

FIG. 2A illustrates the user plane protocol architecture of a 4G long-term evolution (LTE) terrestrial system, and FIG. 2B illustrates the user plane protocol architecture for a LEO/MEO satellite system, according to example embodiments. It is noted from FIG. 2B that the interface from eNB' to SGW is a standard S1-U interface. This feature permits the use of COTS core network element. Similarly, all interfaces within the core network and to/from core network are based on 4G LTE standards.

Figure 3A:
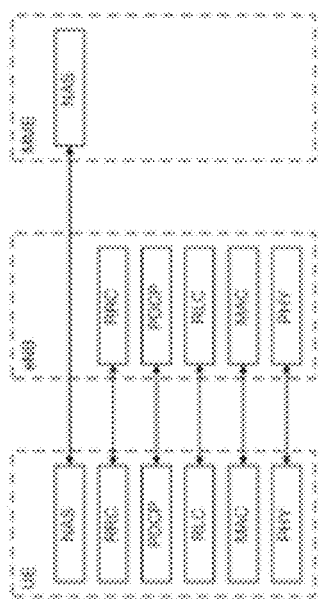
FIG. 3A illustrates the control plane protocol architecture of a 4G long-term evolution (LTE) terrestrial system.
Figure 3B:
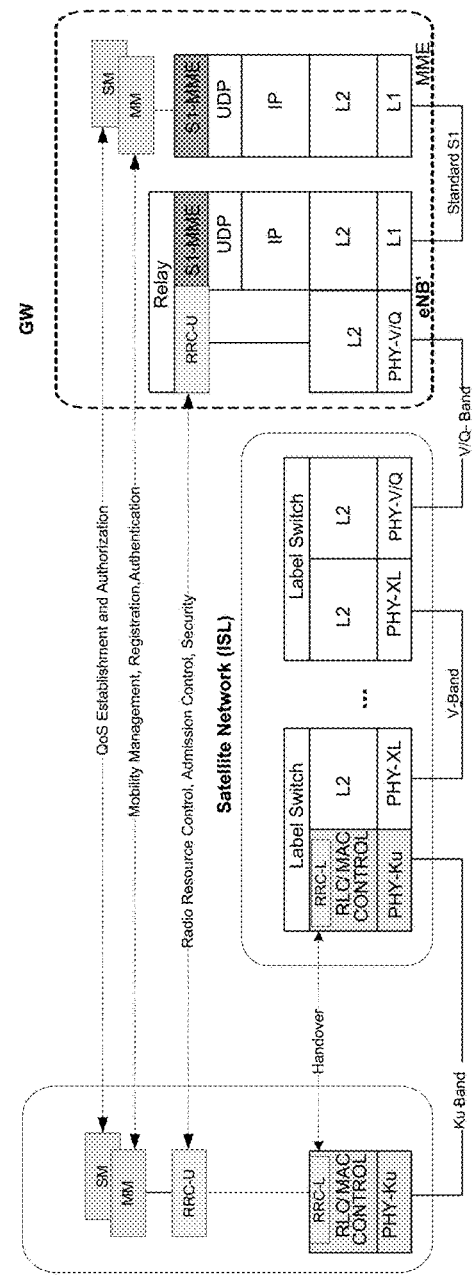
FIG. 3B illustrates the control plane protocol architecture for a LEO/MEO satellite system, according to example embodiments.

FIG. 3A illustrates the control plane protocol architecture of a 4G long-term evolution (LTE) terrestrial system, and FIG. 3B illustrates the control plane protocol architecture for a LEO/MEO satellite system, according to example embodiments. Similar to user-plane discussion above, this has resemblance to the control plane 4G LTE protocol architecture (FIG. 3a) with the following additional key differences. Satellite system protocol architecture for Control Plane is similar to terrestrial 4G-LTE Control Plane protocol architecture shown in FIG. 3A. The PHY, MAC/RLC and RRC layers are optimized for satellite environment. When satellites involved are not processing satellites, the eNB functions are implemented in a satellite gateway. However, for systems that have processing satellites, protocol architecture in Control Plane for the satellite system have the following key differences.

- PHY layer is moved to the communicating LEO/MEO satellite on the user link.
- MAC/RLC, RRC and PDCP may be located in satellite or gateway depending on permitted complexity of satellite, the need to have mesh connectivity between user terminals. The entity in the Gateway performing these functions is called herein as eNB'.
- When RRC is implemented in satellite, RRC is divided into RRC-L (RRC-Lower) and RRC-U (RRC-Upper) layers; RRC-L is located in the satellite and is responsible for handover signaling with UT. RRC-U is located in the eNB' and is responsible for resource management functions including admission control.
- RRC-U communicates with PDCP layer in eNB' to configure security, header compression and data compression schemes.
- In FIG. 3B, although Ku band is depicted for the user link, system design embodiments also facilitate use of Ka band or L/S bands for improved availability.

It is noted from FIG. 3B that the interface from eNB' to SGW is a standard S1-U interface. Similarly, from FIG. 3B, the interface from eNB' to MME is a standard S1-MME interface These features permit the use of COTS core network element. Similarly, all interfaces within the core network and to/from core network are based on 4G LTE standards.

Physical Layer

On the user link, use of multi-carrier (each with its own Power Amplifier) and single wideband carrier are considered for this system. Single wideband carrier provides better resource usage (multiplexing) efficiency, however will require a power amplifier with higher output power. Use of multiple carrier with its own power amplifier solves this problem, however, analog multiplexing to an antenna port as well as resource multiplexing inefficiency have to be managed. Physical layer is based on state-of-the-art LDPC codes or turbo codes in both forward and return links. The following are some attributes of forward link and return link multiple access schemes.

Forward Link
  FDMA/TDM
  Control/traffic channels multiplexed in time

Return Link
  Traffic channels: MF-TDMA or terrestrial standard such as SC-FDMA
  Control channels/narrow band data: Slotted Aloha, spread spectrum with MUD etc.

Return Link Physical and Logical Channels are as follows:
  Return Link Physical and Logical Channels are as follows:
    Packet Data Channel (PDCH): Transport PDTCH (Packet Data Traffic Channel) logical channel and Uplink Control Messages
    Random Access Channel (RACH): Transport RACH channel The following table provides a description of the logical channels in return link

| Physical Channel | Logical Channel | Description |
|---|---|---|
| PDCH | PDTCH | Packet data traffic channel. The channel is also used to carry uplink control messages. MAC control messages are multiplexed along with data on this channel. |
| RACH | RACH | Random access channel for sending Channel Request. |

Forward Link Physical and Logical Channels are as follows:
  Packet Data Channel (PDCH): Transport PDTCH (Packet Data Traffic Channel) logical channel and Downlink Control Messages
  Packet Control Channel (PCCH): Transport following logical channels (Broadcast Channel, Paging Channel, Access Grant Channel, Packet Data Control Channel)

The following table provides description of the logical channels in forward link

| Physical Channel | Logical Channel | Description |
|---|---|---|
| PDCH | PDTCH | Packet data traffic channel. The channel is also used to carry downlink control messages. MAC control messages are multiplexed along with data on this channel. |
| PCCH | BCCH | System information including system synchronizaton, satellite ephemeris, access parameters |
|  | PCH/AGCH | Paging channel or Access Grant Channel in response to RACH |

Time slot and frame Definition Example:
  1 ms frame consists of 12 time slots
  A time slot is a minimum duration that carries burst
  FIG. 4A illustrates a physical layer burst, according to example embodiments.
  The Burst consists of
    UW, Control Header (PUI), Payload
    PUI is located at the front of the burst: Contains MCS, ULMAP, DLMAP, Payload presence information, ARQ related signaling, Power Control Command
    UW symbols may be placed across burst
  For PUI, an alternate embodiment is to use convolutional codes instead of LDPC/Turbo Codes.
  A burst can carry either PDTCH only or PCCH/PDTCH
    No difference in physical layer processing
    The classification of PCCH/PDTCH is done in MAC
    Burst contains PCCH/PDTCH is PI/2-BPSK modulated PCCH can be scheduled every 10 ms
- UT may wake up every [10] ms to read PUI and check for PAGE (The presence of payload is indicated in PUI, minimizing Satellite and UT power consumption)

A given burst may carry blocks that have different modulation and FEC schemes. If a burst were to contain blocks that were BPSK and QPSK modulated, for a processing satellite it is proposed to repeat the QPSK symbols instead of changing modulation scheme to BPSK within a burst but perform appropriate repetition for improved performance. This keeps satellite design simple. In other words, if one of the payloads were to be carried using pi/2 BPSK and other payloads were to be carried using pi/4 QPSK, then the BPSK symbols of the payload would be carried using repeated QPSK symbols so that the entire burst would look like pi/4 QPSK. The receiver then combined multiple pi/4 QPSK symbols for the BPSK region of the burst.

Frame Hierarchy Example
- Time slot: 1/12 ms (burst duration in multiple integer of TS)
- Frame: 1 ms (single or multiple Uplink/downlink allocation signaling)
- Multi-frame: 10 ms (paging once every 10 ms)
- Super frame: 40 ms (BCCH info update with class 1 information occurring every 10 ms)
- Hyper frame: 1 second
- Forward Link Transmission structure example
- Extremely simple and efficient for signaling
- Efficient reference signal design that serves multiple purposes
    - Fast acquisition, reliable synchronization, etc.
- Dedicated control field with predefined number of bits available every 1/12 ms for any essential control signaling such as downlink, uplink allocation, MCS, DRX, hybrid ARQ feedback, etc.
- Shared PDCH available every 1/12 ms which could be periodically (every 10 ms) used for providing control info simultaneously to many users (i.e., broadcasting system information)

RACH Design in Return Link

FIG. 4B illustrates a return link RACH window, according to example embodiments. The RACH is carried on a narrowband carrier with large RACH window to accommodate timing uncertainties within a beam. In the single burst format for narrow band PDCH and RACH only additional preamble is attached at the beginning and end of the burst when RACH is transmitted, which allows uniform design of PDCH and RACH design.

FIG. 4C illustrates an example of control messages (such as RACH and traffic) multiplexed on the same narrowband carrier, according to example embodiments.

Further control messages (such as RACH and traffic) can be multiplexed on the same narrowband carrier. Traffic on narrowband carrier allows for small packets such as TCP ACK to be transmitted and at the same time off-loading the wider band traffic carriers.

Hybrid ARQ

Given that the delays in LEO/MEO satellites are much shorter than that of GEO satellites, concepts such as Hybrid ARQ (HARQ) are applicable in this system. HARQ Parameters are derived based on the following assumptions:
- Return Link: 20 Msym/sec. Burst duration in return link is 0.5 ms
- Processing delay is 2 ms, Propagation delay between Terminal and Satellite 4 ms
- Synchronous transmission
- ACK sent immediately on receiving the packet (Stop and Wait)
- If only one burst is sent, next opportunity to retransmit the burst is after 13 ms (26 return link time units).

Hence a total of 26 HARQ processes assumed using return link HARQ framework similar to LTE.

Signaling for Synchronous HARQ

Additional control signaling from SAT to UT indicate retransmission or new transmission. If synchronous transmission is employed, then retransmissions are scheduled exactly HARQ_window slots after the original transmission. If an allocation is made in uplink slot k, then slot k is for original transmission, slot k+HARQ_window is for retransmission 1, slot k+2*HARQ_window is for retransmission 2. Only when ACK received can the same HARQ process (and corresponding time slots) can be assigned to other allocations.

FIG. 4D illustrates an example of synchronous HARQ signaling, according to example embodiments. If too many allocations are made in the HARQ_window then system might be unable to accommodate new allocations. Therefore a threshold limit is set on the number of new transmissions within a HARQ_window.

Asynchronous HARQ
- Restrictions imposed by synchronous HARQ from scheduling point of view
- Is it possible to use asynchronous HARQ
    - Explicit process ID needed
        - Process ID width will be the number of HARQ process supported
        - Process ID is 3 bits for LTE FDD
    - How long to store packets in the buffer?
- Asynchronous new transmissions and asynchronous retransmissions
    - Buffer storage can be potentially huge
    - Need limits on maximum number of HARQ processes supported Hybrid Hybrid ARQ (HHARQ)

FIG. 4E illustrates an example of hybrid HARQ signaling, according to example embodiments. The hybrid Hybrid ARQ (HHARQ) facilitates use of asynchronous transmissions for new transmissions and scheduling retransmissions in a synchronous manner. The buffer size depends on the time interval between the original transmission and the retransmission. An explicit HARQ process ID is used to achieve this Bundling When users are in disadvantaged location, instead of waiting for ACK/NACK from satellite, bundle the new transmission and the retransmissions. When retransmitted packet contents are similar to original packet (Chase combining) then this is similar to repetition. This may introduce time interval between original transmission and retransmissions to take advantage of time diversity.

Dynamic Link Adaptation

The satellite links will support dynamic link adaptation to cater to different channel conditions that the user terminal experiences as the satellite moves. The extent to which beam pattern gains change as the satellite moves depends on the satellite antenna shape, aperture size and frequency of operation. Figure below indicates that the gain can decrease much as 8-10 dB at the edge of the beam as compared to the center of the beam for about a 20 cm antenna horn operating at 14.5 GHz frequency.

Figure 5A:
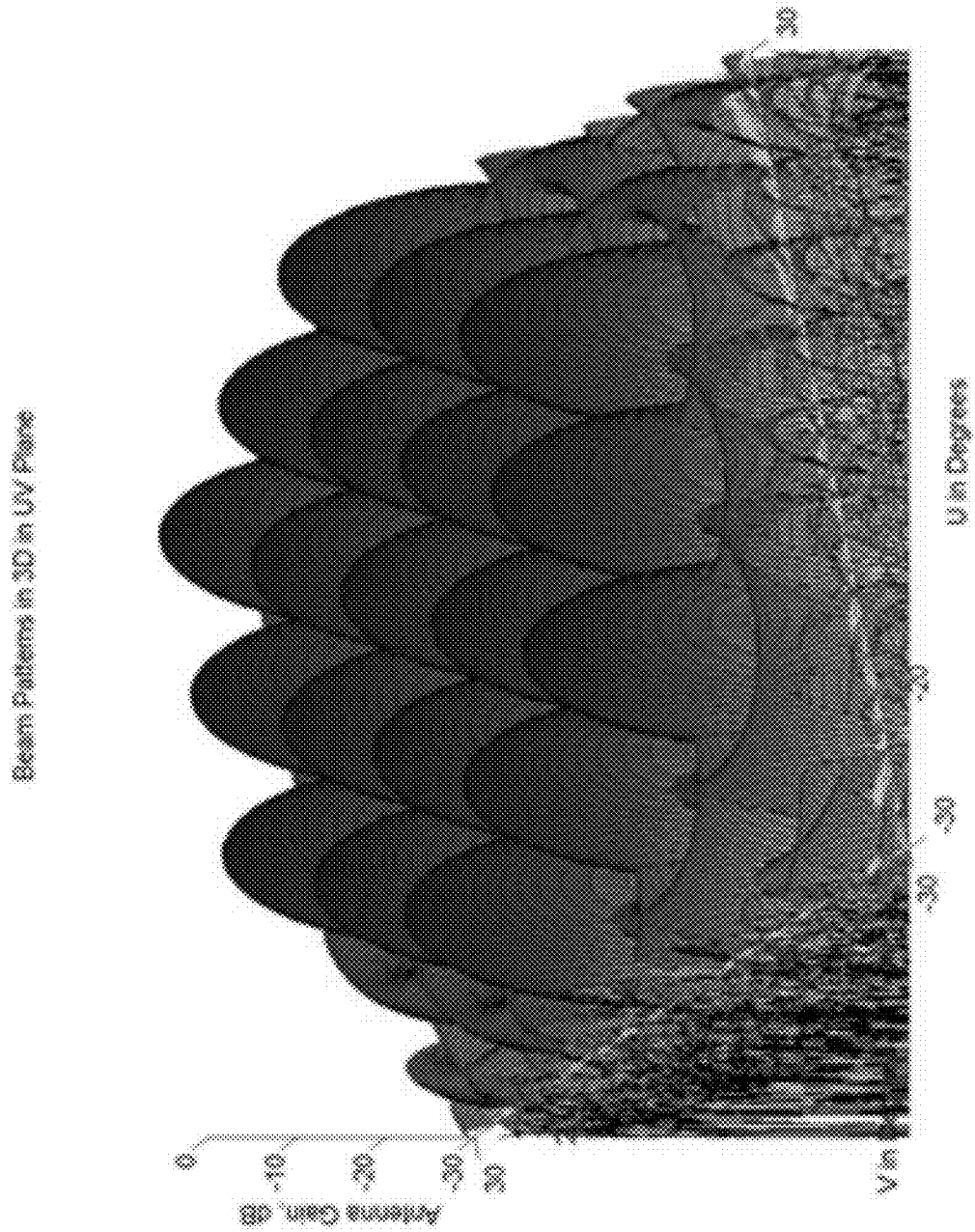
FIG. 5A depicts a 3-D graph showing antenna gain in a satellite system, according to example embodiments.

FIG. 5A depicts a 3-D graph showing antenna gain in a satellite system, according to example embodiments.

In addition, environmental conditions (rain, clouds etc.) also influence the attenuation that the signal undergoes. Finally, the C/I that the links have are a function of the load and in the return link the relative location and power of interfering users compared to the user of interest. All these factors motivate the need for dynamic link adaptation whereby the throughput is maximized for a given channel condition by changing the modulation and coding scheme based on channel condition. This is illustrated in figure below.

Figure 5B:
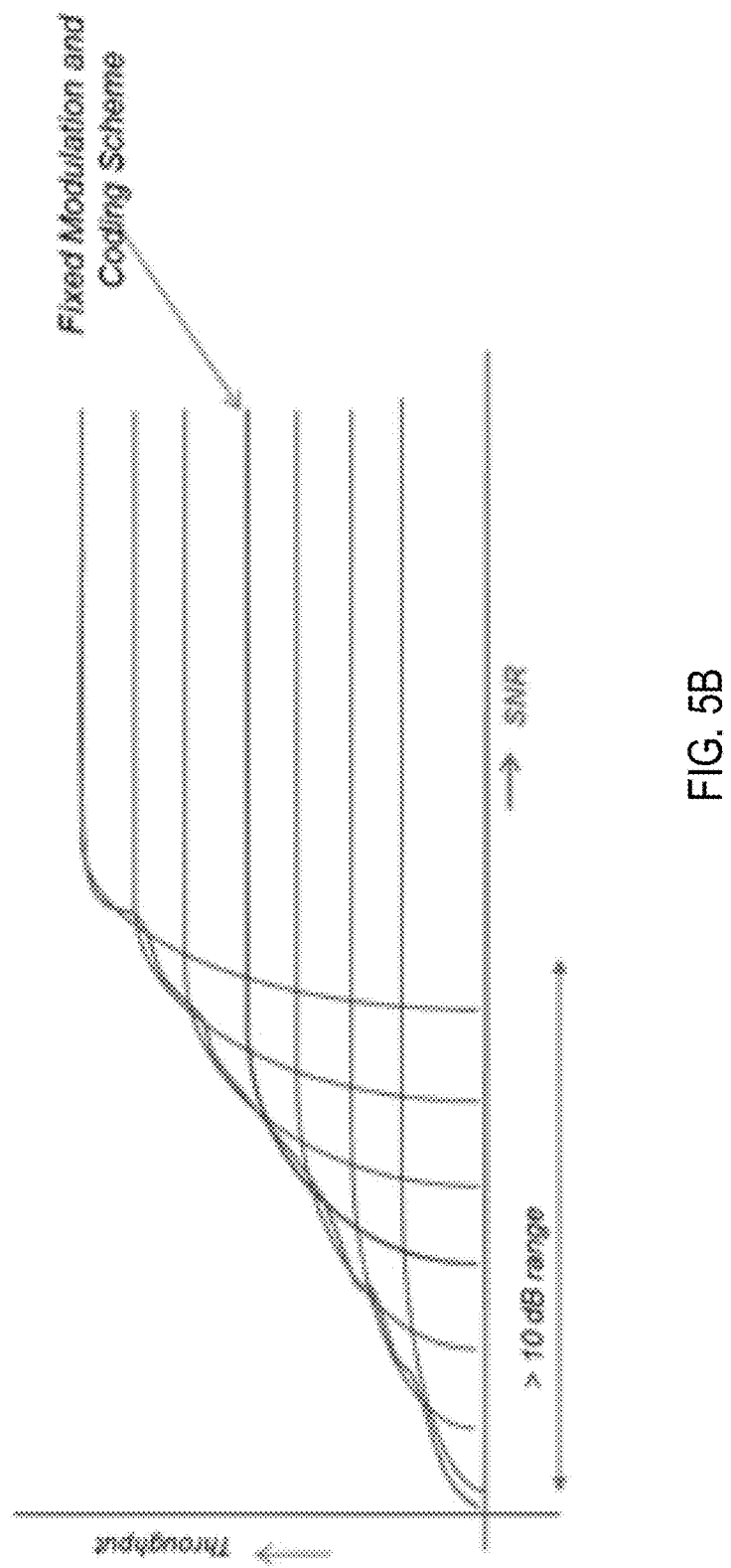
FIG. 5B depicts a graph showing system throughput with adaptive coding and modulation in a satellite system, according to example embodiments.

FIG. 5B depicts a graph showing system throughput with adaptive coding and modulation in a satellite system, according to example embodiments.

To this end, the physical layer bearers are defined such that they span the various modulation and coding schemes to give 10 to 15 dB of channel quality variation. The modulation schemes are from repeated pi/2 BPSK to pi/4 QPSK to 3pi/4 8-PSK to 16-APSK. Coding rates vary from Rate 1/5 code to Rate 9/10 code using LDPC codes.

Battery Conservation Feature

Battery conservation is an important feature for both user terminal as well as satellite. When a user terminal is battery or solar powered, this feature becomes even more critically important. Accordingly, a scheme is developed whereby a user terminal in idle mode will only wake up for less than 0.5 ms every 10 ms, thereby leading to a reduction in battery consumption by up to 95%. This is facilitated by the satellite/network only paging the user terminal at the wake up time of the terminal. Therefore, there is a need to establish the concept of a system time. The system time is established by the satellite based on the GPS receiver it has. It uses the 1 pulse per second ticks to establish frame markers in the satellite downlink. The user terminal is made aware of these ticks by using a special sequence of unique words in the user link downlink at the 1 PPS or an integer submultiple of 1 second. An example scheme is illustrated in figure below wherein a DVB-S2 format is modified to achieve this establishment of frame markers. This concept is also applicable to framework other than DVB-S2 such as the one described earlier in the document for Physical Layer.

Figure 6A:
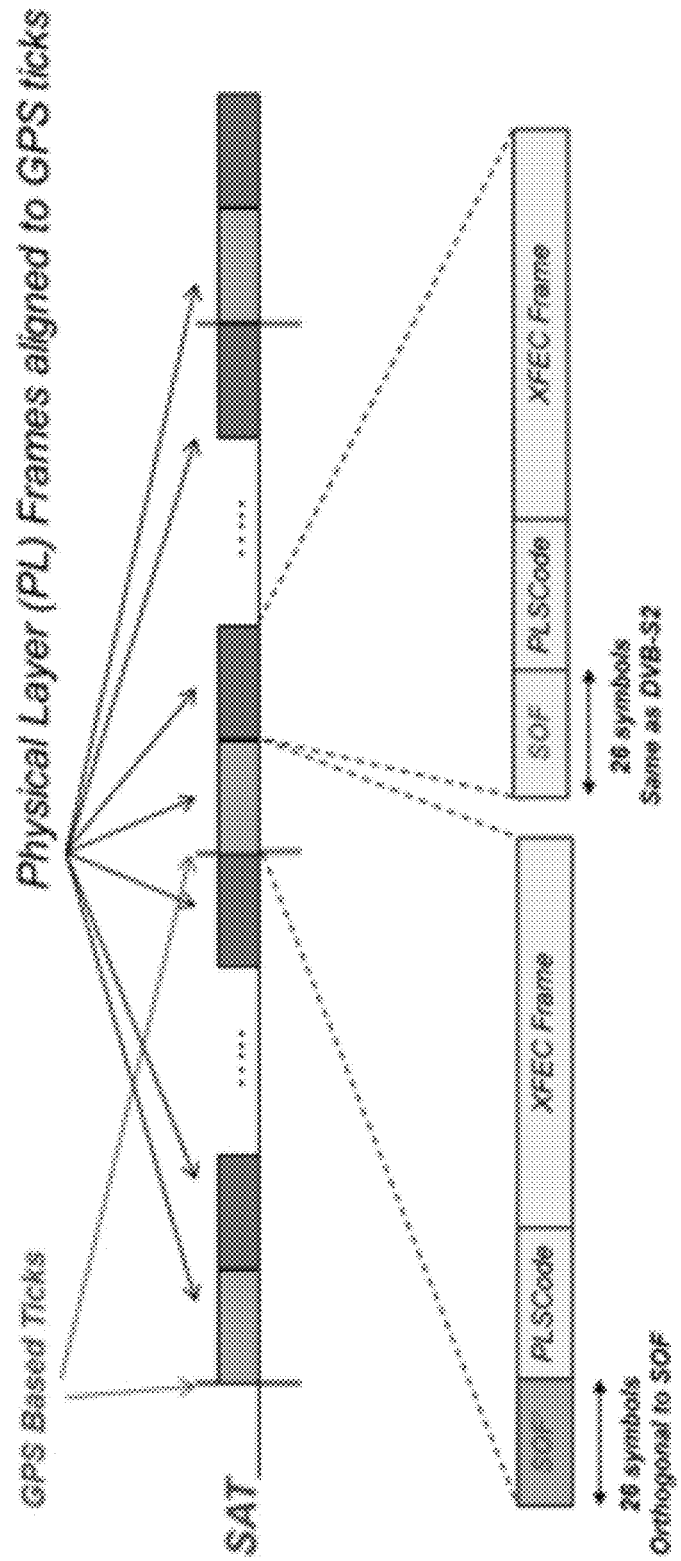
FIG. 6A illustrates modification of a DVB-S2 format to achieve the establishment of frame markers reflecting system time for a user terminal battery conservation technique, according to example embodiments.

FIG. 6A illustrates modification of a DVB-S2 format to achieve the establishment of frame markers reflecting system time for a user terminal battery conservation technique, according to example embodiments. User terminals performs dual hypothesis to determine the frame marker used by the satellite. An important advantage of this scheme is that, since these markers are based on GPS, these markers are aligned across all satellites—this helps when there is a satellite to satellite handover, since there is no need to re-establish these frame markers. User terminal states and behavior is shown below that achieves about 95% reduction in battery usage.

Figure 6C:
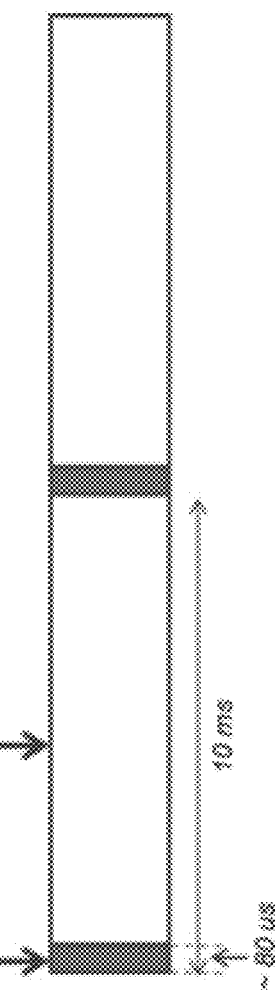
FIG. 6C illustrates satellite transmissions to a user terminal for reduction in terminal battery usage, according to example embodiments.
Figure 6B:
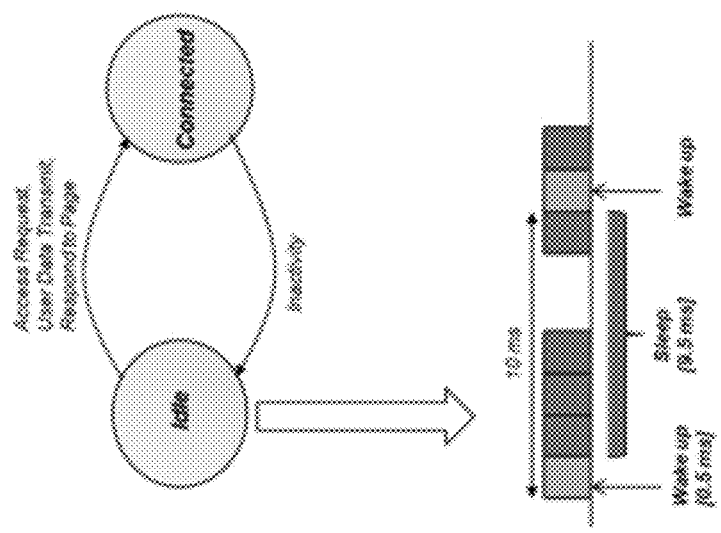
FIG. 6B illustrates a user terminal state behavior for reduction in terminal battery usage, according to example embodiments.

FIG. 6B illustrates a user terminal state behavior for reduction in terminal battery usage, according to example embodiments.

The air interface described herein further reduces battery consumption in user terminal even in the Connected State. Here the downlink burst in the front has information regarding the user(s) to which the rest of the burst belongs. A user terminal first demodulates and decodes the front part of the burst to determine if the rest of the burst had data for it or not. If not, user terminal powers down until the beginning of next burst thereby saving power. As an example, when the front portion of the burst is 4 microseconds long and burst duration is about 80 microseconds, then assuming that the terminal is consuming power for no more than 8 microseconds, the saving is 90% in connected mode when there is no burst for it. If a terminal is active 20% of the time and 10% of the downlink bursts are meant for the terminal, then total battery consumption in connected mode is only is 7.8% leading to a power saving of 92.2% for the baseband part of the user terminal.

A facility for further reduction in battery power consumption in idle mode is also provided. Here the front part of the burst also contains a bit to indicate whether the rest of the burst contains a page message or not. User terminal therefore needs to wake up for about 8 microseconds every 10 ms in idle mode leading to a very negligible power consumption in idle mode.

In a LEO/MEO environment, the satellite orbits the earth in less than 2hours and will therefore have very short visibility to the sun for charging its battery in each orbit. Therefore, if there are no active users at all in a beam, the satellite does not spend any power for 10 ms. Every 10 ms satellite would transmit system information for about 80 microseconds leading to a battery saving of more than 99%. In other words, power overhead will be less than 1%.

FIG. 6C illustrates satellite transmissions to a user terminal for reduction in terminal battery usage, according to example embodiments. Based on extrapolation of timing and frequency, user terminal will be able to go to complete sleep for about 10 ms and wake up and still be able to demodulate and decode the burst.

MAC Layer Attributes

A flexible and efficient MAC layer is provided for both access as well as traffic. MAC layer design is based on Bandwidth on Demand (BoD) and therefore the proposed method provides dynamic allocation of resources based on demand. For access channels, a narrowband (e.g., 1 MHz carriers) channels are used, and for traffic, narrowband or wideband (e.g., 17.5 MHz) channels are used in a dynamic way so as to use the available uplink resources in a very efficient manner.

Figure 7A:
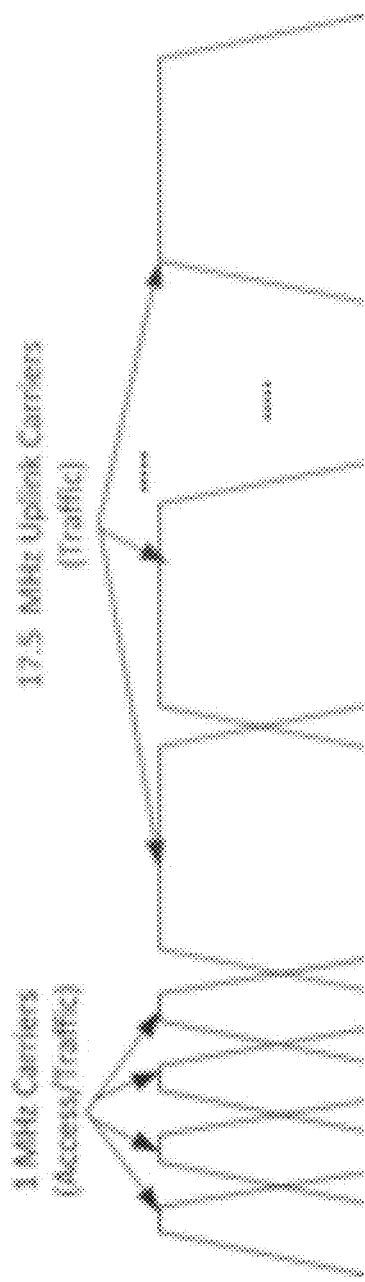
FIG. 7A illustrates example of carrier channels for access and traffic channels of a flexible media access control (MAC) layer bandwidth on demand design, according to example embodiments.

FIG. 7A illustrates example of carrier channels for access and traffic channels of a flexible media access control (MAC) layer bandwidth on demand design, according to example embodiments. Key attributes include:

Low bandwidth (1 MHz) access channel for initial access
  Minimizes signaling overhead
  Keeps satellite receiver simple
  Can be used to request access as well as transfer data
Frequent Uplink allocation signaling to minimize delay (0.5 ms)
Control and Data packet multiplexing for improved spectral efficiency
Unsolicited uplink grants to further decrease delay of uplink allocation (see figure below). Here the satellite provides an Unsolicited Uplink Grant (UUG) to user terminal so that the terminal can transmit TCP Acknowledgements using UUG on the traffic channel right away without soliciting resources from the satellite. This provides delay efficiency. It is noted that for half duplex terminals, the terminal cannot receive while it is transmitting. Therefore, satellite cannot transmit in downlink when user terminal has been allocated an uplink resource, including UUG. The UUG scheme is thus different for half-duplex terminals compared to full-duplex terminals. For half-duplex terminals, the frequency of UUGs will be less than that for full duplex terminals.

Figure 7B:
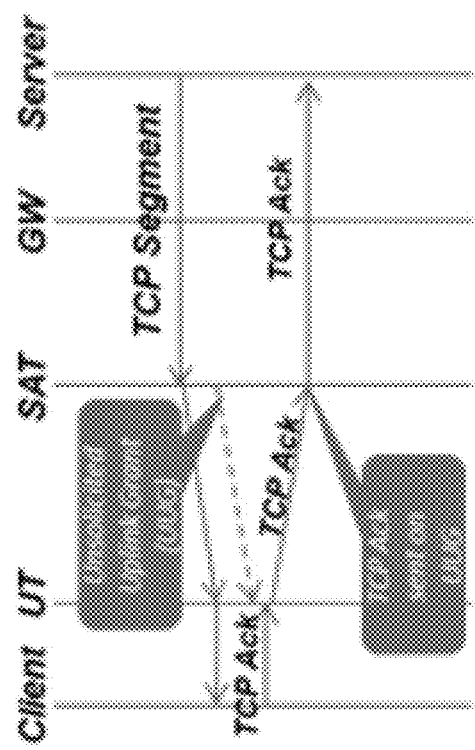
FIG. 7B illustrates an example MAC layer bandwidth on demand unsolicited uplink grant (UUG), according to example embodiments.

FIG. 7B illustrates an example MAC layer bandwidth on demand unsolicited uplink grant (UUG), according to example embodiments.

MAC layer signaling and scheduler design supports multiple terminal types. The half-duplex and full duplex terminal types mentioned above is one such example. It also supports fixed and mobile terminals, wideband and ultra-wideband terminals. Further, beam level signaling is employed instead of carrier level signaling. In beam level signaling, a user terminal is not tied to a particular carrier in uplink. Network may allocate resources on any uplink carrier dynamically based on availability and honoring the switching constraints of the user terminal to switch frequencies.

RLC/MAC Context

Figure 8:
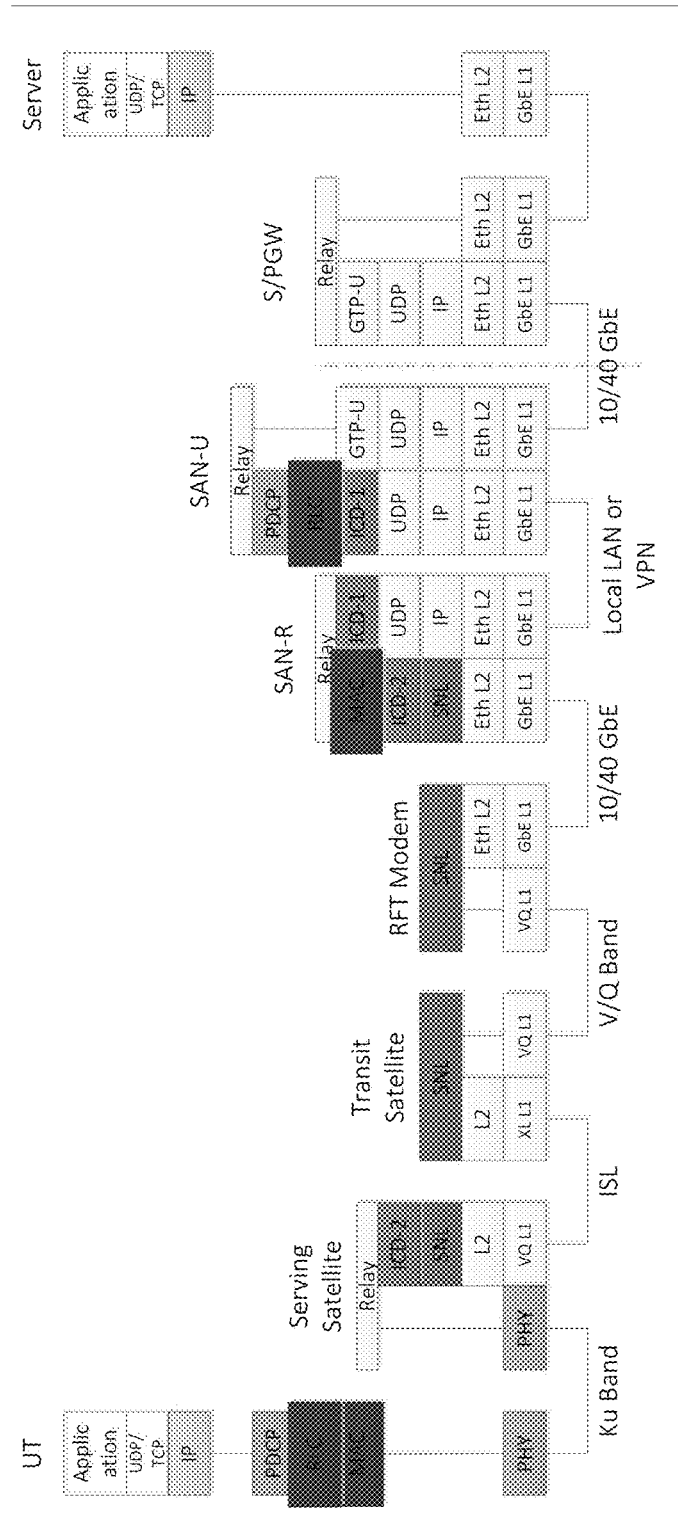
FIG. 8 illustrates the RLC MAC layer context of a satellite system, according to example embodiments.

FIG. 8 illustrates the RLC MAC layer context of a satellite system, according to example embodiments.

Downlink Burst and Public Information (PUI)

FIG. 9 illustrates an example MAC layer downlink burst and public information (PUI), according to example embodiments.

The PUI carries the following set of information:
Modulation and coding scheme of the FEC blocks in the Private Information (PRI)
User identifier of the data carried in the FEC blocks
Uplink allocation
    User identifier
    Power control bits
    Carrier index
    Number of assigned consecutive transmissions
    Indication if additional information present in PRI
Block Boundary This feature provides flexibility and fewer RLC/MAC headers, i.e., less overhead. It indicates how the MAC layer should interpret the multiple FEC blocks in the PRI. It indicates whether the MAC layer byte stream straddle the FEC blocks. The field indicates how the multiple FEC blocks are grouped as shown in the figure below.

FIG. 10 illustrates an example MAC layer block boundary encoding, according to example embodiments.

Downlink User Addressing and Terminal Power Consumption

Figure 11A:
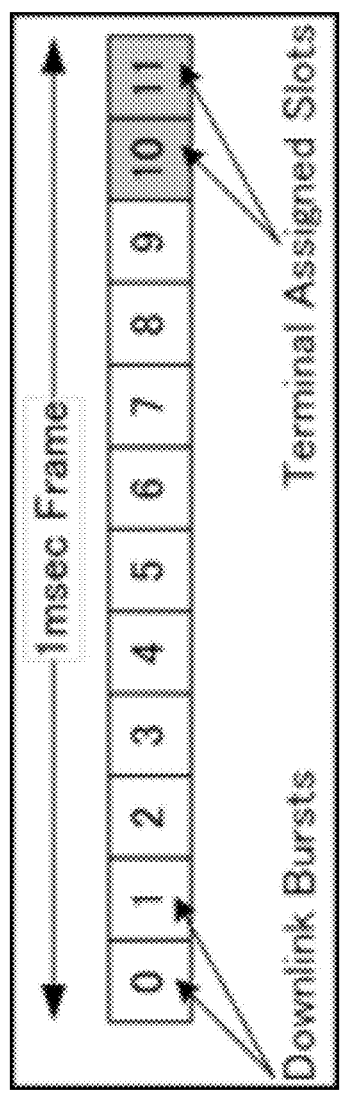
FIG. 11A illustrates an example slot assignment, according to example embodiments.

The addressing scheme tries to minimize terminal battery usage and the processing of downlink data not destined to UT. It improves channel efficiency by filling up downlink bursts and sending to multiple terminals at the same time. It also provides low latency when scheduling terminals Slot Assignment and Terminal Addressing FIG. 11A illustrates an example slot assignment, according to example embodiments.

Figure 11B:
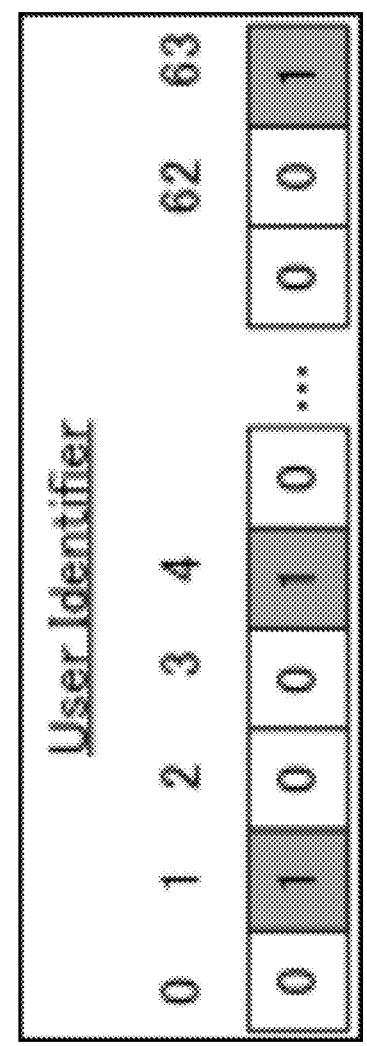
FIG. 11B illustrates an example terminal addressing, according to example embodiments.

User terminal is provided
    Slot Id and periodicity. i.e., slot#5 every 2 frames
    Or a bitmap on 000000 000011. i.e., last 2 slots of every frame
Decision factors
    Terminal type and battery status
    User demand, specifically any guaranteed bit traffic flows
    Number of active flows and aggregate user demand
    More efficient to transmit to terminals with similar channel condition in the same burst
Terminal bitmap can be updated and sent to UT based on above factors Terminal Addressing Embodiments provide for a mixture of the 2 operating points balancing throughput efficiency, low latency and terminal power efficiency Unicast Addressing:
    A user identifier per FEC block (4*16 bit user identifier)
        a terminal only processes the FEC block when the address matches
Multi-user Addressing
    When assigning a slot to a terminal, a terminal is also provided an identifier x from (0-63), only valid in the assigned slot. Terminal address is $2^x$ FIG. 11B illustrates an example terminal addressing, according to example embodiments.

Use of a 64bit user identifier bitmap to instruct UT to decode FEC blocks
Only terminals with bit set need to decode FEC blocks.
    i.e., if terminal address is $2^x$ and bit x is set
Terminal addressing space is 64*Periodicity (slots)

Radio Resource Management Protocol

RRC is based on LTE procedures with modifications for the satellite environment. Use standard interfaces to the Evolved Packet Core(EPC) network (36.413-S1AP, 36.423-X2AP, 24.301-NAS)

Figure 12A:
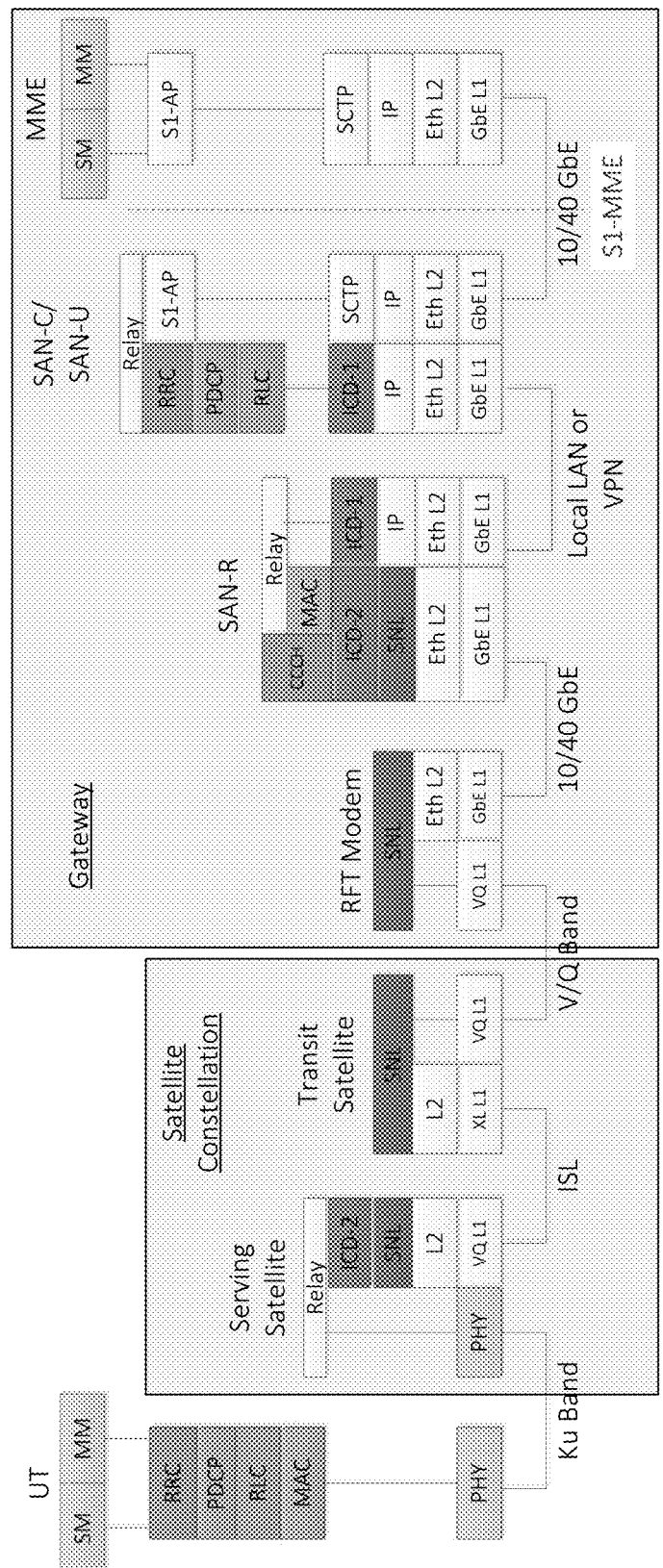
FIG. 12A illustrates the RRC control plane architecture of a satellite system, according to example embodiments.

FIG. 12A illustrates the RRC control plane architecture of a satellite system, according to example embodiments.

Figure 12B:
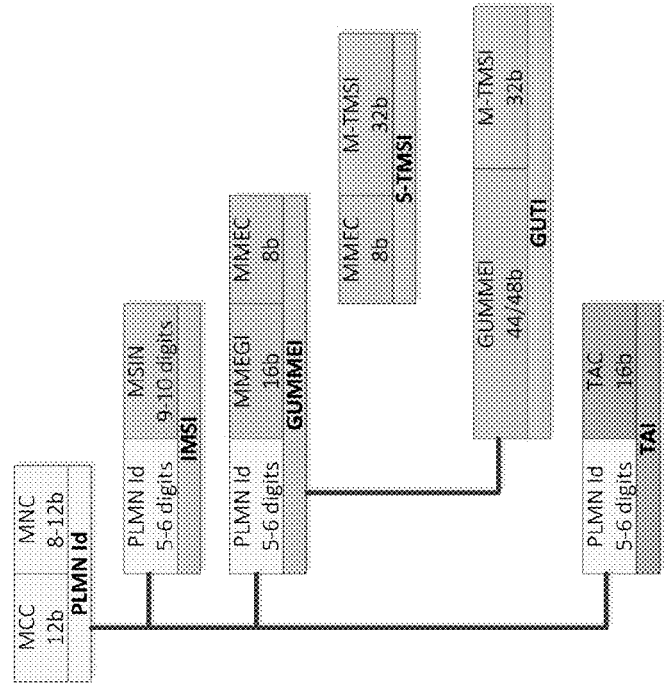
FIG. 12B illustrates an example RRC state diagram, according to example embodiments.

RRC context
    Resides in GW (SAN-C subsystem) and UT
    Implements connection, bearer, mobility, resource management functions
    Uses acknowledged mode bearers (PDCP, RLC-AM, MAC, PHY)
    Also uses Common Control Channels for some procedures
    Ciphering, integrity protection provided by PDCP
    Carries NAS MM/SM signaling transparently
    Interfaces at S1 interface to LTE core (MME)
RRC State Model
    Addition of RRC_PCH state enables UT dynamic DRX feature and reduces time to data transfer state FIG. 12B illustrates an example RRC state diagram, according to example embodiments.

Figure 12C:
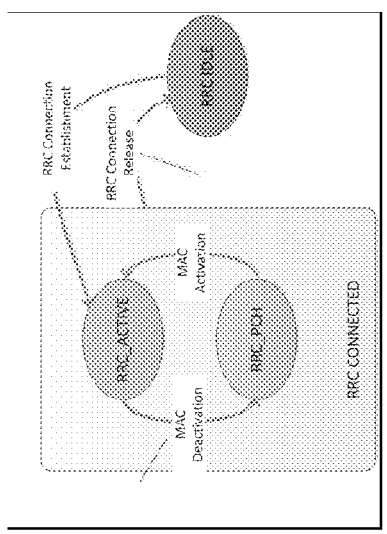
FIG. 12C illustrates RRC user terminal identifiers for identifying and tracking UT context, according to example embodiments.

The RRC states and sub states can be categorized as follows
    RRC Idle
        UT control plane not established
            No UT context in SAN
            UT context exists in EPC (MME) if EMM-Registered
            UT monitors BCCH, PCH
            Connection establishment can be triggered by UT or by paging from EPC
    RRC Connected
        Control and data bearers context established
            UT context exists in EPC and in SAN
        a) RRC_ACTIVE
            Radio resources assigned
            UT monitors assigned slots in DL traffic channel
            UL/DL transmission can happen
        b) RRC_PCH
            No radio resources assigned
            UT monitors BCCH, PCH
            MAC layer reactivation can be triggered by UT or by paging from SAN
UT Identifiers
    Multiple UT identifiers are needed to identify and track UT context at different levels and in different states FIG. 12C illustrates RRC user terminal identifiers for identifying and tracking UT context, according to example embodiments.

SAN-assigned
  RRC:
    S-RNTI (Satellite Radio Network Temporary Id)
      GWID (8b)+Logical SAN-C Id [7b]+UT Id
      [17b]-TBC
  MAC:
    MAC User id (16 bits)
    FL slot# (1-12), period (1-4?) and Slot-specific UT id
      (6 bits)
SI Broadcast and CCCH Usage
  BCCH: System Information (SI)
    At any time, SI in a beam is broadcast by a single GW
      This primary GW assignment changes as the satellite
        moves over different GW's
  RACH
    RACH capacity can be shared by multiple GWs
    RACHs arriving in a beam may be destined to different
      GWs
      Default (primary) GW decides correct destination
        based on UT type and location
      UT remembers assigned GW
      See "GW Redirection" message flow for details
  AGCH, PCH
    AGCH and PCH capacity can be shared by multiple
      GWs
  Capacity is divided between GWs based on configuration
RRC Functions and Procedures Satellite receives the RACH and examines the GW ID in the label. If null, it fills in the default GW label to be used for RACH (points to the SAN-RC). The satellite also adds the source info identifying the (satellite, beam, carrier, frame, slot) and forwards to the SAN-RC (via ISL and the RFT).

SAN-R processes the RACH. This includes checking the UT coordinates in the RACH to determine/confirm the home GW and determine the TA (using GWSA), fetching the UT satellite/beam trajectory (using EDF), determining the SAN-C instance responsible for this UT (load balancing). SAN-RC then forwards the request with all this data to the SAN-C.

SAN-C performs connection admission and creates the UT context, stores the position and trajectory, assigns the UT identifier (S-RNTI). SAN-C sends the Immediate Assignment on AGCH to the UT via the satellite. The Immediate Assignment contains the timing correction, forward timeslot assignment and MAC id, GW labels for RACH and traffic (SAN-R).

SAN-C sends the RRC Connection Setup message on SRB1 via RFT and satellite to the UT. This contains the MAC layer parameters for the UT, and other parameters needed in connected state. This includes information about upcoming beam & satellite handovers.

| Function | Procedure | Messages | Direction | Bearer |
| --- | --- | --- | --- | --- |
| System Information broadcast | System Information broadcast | BCCH segments | DL | SRB0 |
| NAS Information transfer | DL Information Transfer | DL Information Transfer | DL | SRB2 |
| | UL Information Transfer Piggybacking NAS messages on certain RRC messages | UL Information Transfer | UL | SRB2 |
| RRC Connection Management, Bearer Management | Paging | Paging | DL | SRB0 |
| | RRC Connection Establishment | RRC Connection Establishment Request | UL | SRB0 |
| | | Immediate Assignment | DL | SRB0 |
| | | Immediate Assignment Reject | DL | SRB0 |
| | | RRC Connection Setup | DL | SRB1 |
| | | RRC Connection Setup Complete | UL | SRB1 |
| | RRC Connection Release | RRC Connection Release | DL | SRB1 |
| | MAC Activation | MAC Activation Request | UL | SRB0 |
| | | MAC Activation Confirm | DL | SRB1 |
| | RRC Security Mode | Security Mode Command | DL | SRB1 |
| | | Security Mode Complete | UL | SRB1 |
| | | Security Mode Failure | UL | SRB1 |
| | RRC Connection Reconfiguration | RRC Connection Reconfiguration | DL | SRB1 |
| | | RRC Connection Reconfiguration Complete | UL | SRB1 |
| Position and Battery Reporting | Position Verification | Position Verification Request | UL | SRB0 |
| | | Position Verification Notify | DL | SRB0 |
| | RRC Position Report | RRC Position Report | UL | SRB1 |
| | | RRC Position Report Confirm | DL | SRB1 |

RRC Connection Establishment

UT uses this procedure to attach to the network on power-on

Figure 12D:
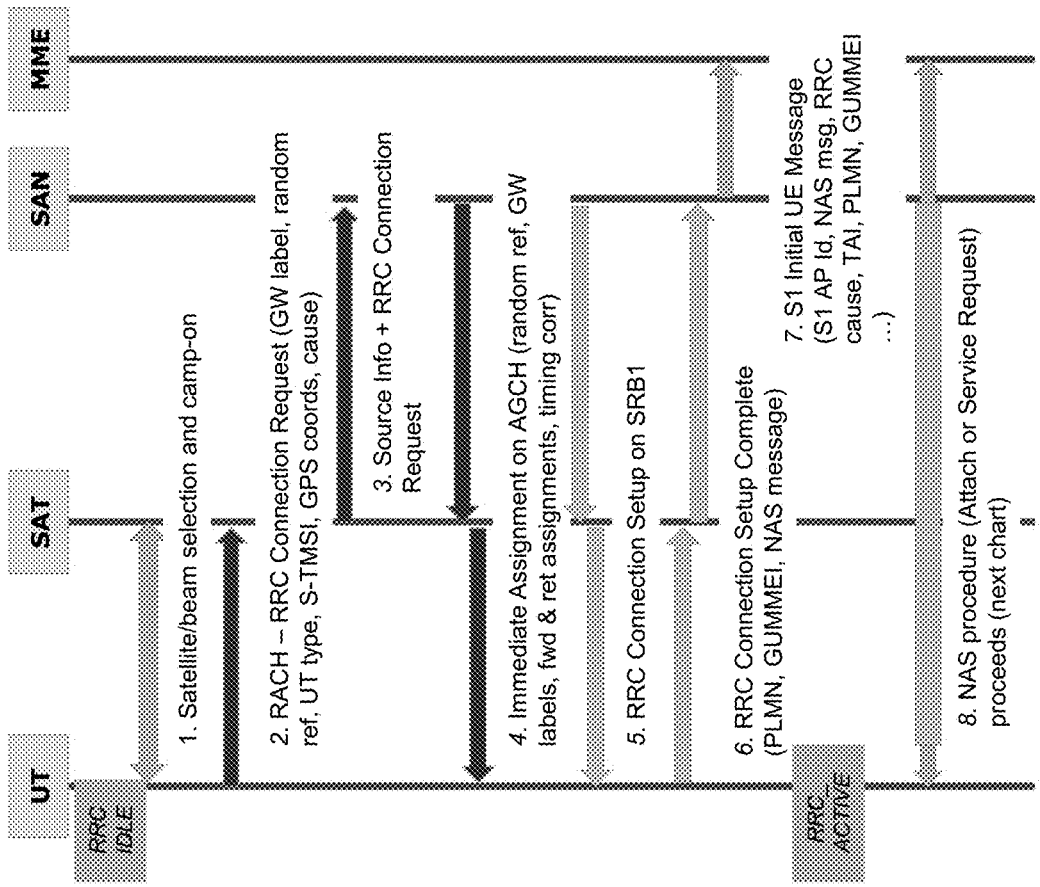
FIG. 12D depicts a signal flow diagram illustrating RRC connection establishment, according to example embodiments.

FIG. 12D depicts a signal flow diagram illustrating RRC connection establishment, according to example embodiments.

UT performs satellite and beam selection and camps on the selected beam.

UT transmits RRC Connection Request on RACH. If the UT already knows its GW label (SAN-RC), it adds it, else it adds an empty destination label for the satellite to fill. The UT also supplies its GPS coordinates and S-TMSI (if available).

UT sends the RRC Connection Setup Complete message on SRB1 with selected PLMN Id, GUMMEI, and a piggybacked NAS message. SAN-C sends the NAS message to the MME.

SAN-C sends an S1 INITIAL-UE message containing the UT's local S1 AP Id, NAS message, the selected PLMN Id, GUMMEI, TAI, etc.

The NAS procedure proceeds. See next chart.

Attach and Bearer Setup

UT completes attach and default bearer is established

Figure 12E:
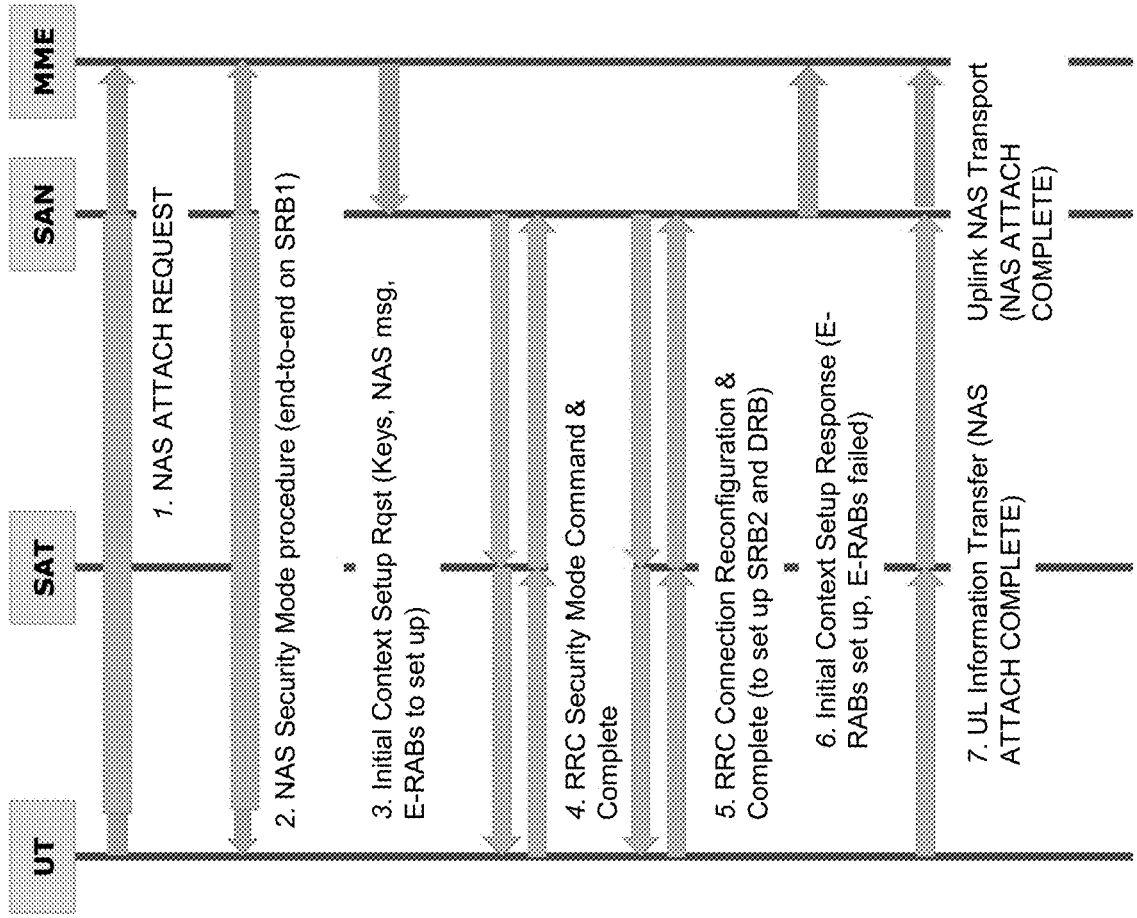
FIG. 12E depicts a signal flow diagram illustrating an RRC attach and bearer setup procedure, according to example embodiments.

FIG. 12E depicts a signal flow diagram illustrating an RRC attach and bearer setup procedure, according to example embodiments.

SAN-C sends an S1 INITIAL-UE message containing the UT's local S1 AP Id, NAS ATTACH message, the selected PLMN Id, GUMMEI, TAI, etc. (see previous chart).

MME performs the NAS Security Mode procedure (mutual authentication and key exchange) with the UT. This is carried transparently in NAS Downlink/Uplink Transport messages over S1 and over SRB1 in RRC DL/UL Information Transfer messages.

MME gives SAN-C the UT context info in the S1Initial Context Setup Request message. This includes UT security keys and the details of default E-RAB to be set up. It also includes the NAS ATTACH ACCEPT message for the UT SAN-C computes the ciphering and integrity protection keys and configures the user plane (SAN-U PDCP). It also performs AS security activation using the RRC Security Mode procedure over SRB1.

SAN-C performs bearer admission, establishes the radio bearers for the default E-RAB indicated by the MME and for SRB2. The RRC Connection Reconfiguration On extended inactivity, the SAN indicates to the EPC (MME) that it wishes to release the UE context by sending a UE Context Release Request with cause "user inactivity". The MME sends a S1 UE Context Release Command.

The SAN triggers SAN originated paging.

When the UT responds, the SAN sends the UT an RRC Connection Release. The UT transitions to RRC Idle and sets its DRX interval to the default value.

The SAN sends the MME a S1 UE Context Release Complete. The SAN also stores the UT's S-TMSI and last reported position in a database for use in idle mode paging.

Paging Scenarios

Paging principles

Paging applies in RRC Idle and RRC_PCH states

UT reports its position to SAN if it moves more than [50 km]

SAN determines satellites and beams to be used to page at UT's last known position

| UT NAS States | UT RRC State | Paging Mechanism | Comment |
| --- | --- | --- | --- |
| EMM Deregistered ECM Idle | RRC Idle | None | No data bearers, hence no paging needed |
| EMM Deregistered ECM Idle | RRC Connected | None | Transient state while attaching |
| EMM Registered ECM Idle | RRC Idle | EPC triggers paging by MME-assigned id (S-TMSI). SAN pages based on UT's last reported coordinates. | SAN stores UT's last reported coordinates when in RRC Idle state to facilitate accurate paging. |
| EMM Registered ECM Idle | RRC Connected | None | Transient state while connecting |
| EMM Registered ECM Connected | RRC Connected: RRC_PCH | SAN triggers paging by SAN-assigned id (S-RNTI). SAN pages based on UT's last reported coordinates. | SAN stores UT's last reported coordinates in UT context when in RRC_PCH state. |
| EMM Registered ECM Connected | RRC Connected: RRC_ACTIVE | None | Active radio resources, hence no paging needed | procedure is used to set up RBs. The RRC Connection Reconfiguration includes the return SAN-RU label to be used for data traffic.

SAN-C replies to the MME with the S1 Initial Context Setup Response, indicating which bearers were set up successfully or failed. Local GTP transport addresses & TEIDs for the successful bearers is also included.

Figure 12F:
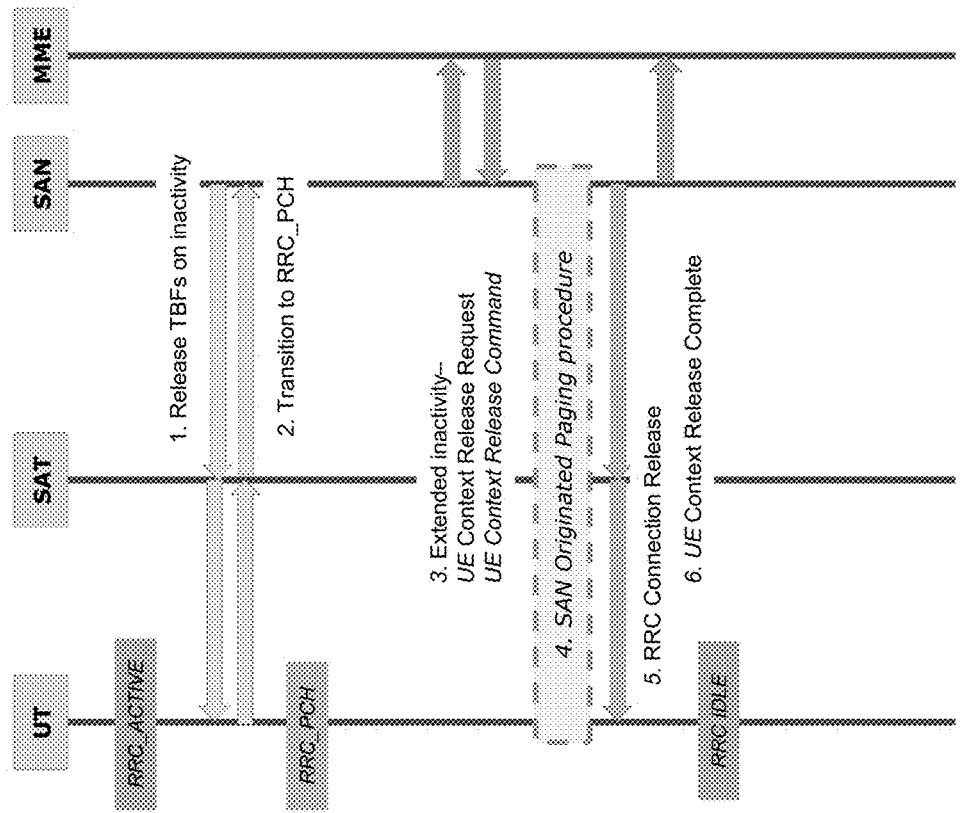
FIG. 12F depicts a signal flow diagram illustrating an RRC transition to idle mode, according to example embodiments.

UT replies to the MME with NAS ATTACH COMPLETE. This is carried transparently over SRB2 in RRC UL Information Transfer and over S1 in S1 Uplink NAS Transport messages Transition to Idle on Inactivity When the UT is idle for a few seconds, it transitions to RRC_PCH. When the UT is idle for many minutes, it transitions from RRC_PCH to RRC IDLE FIG. 12F depicts a signal flow diagram illustrating an RRC transition to idle mode, according to example embodiments.

SAN-R detects TBF inactivity and signals to the UT that the TBFs are being released through MAC signaling.

When the TBF Release has been acknowledged by the UT, the SAN-R removes the MAC layer state for the UT and informs the SAN-U. The SAN-U removes its references to the SAN-R for this UT and informs the SAN-C that the MAC has become inactive. The RBs, RLC and PDCP contexts remain. The SAN-C changes the RRC state to RRC_PCH. The SAN-RU reference is cleared, but the rest of the UT context is retained.

EPC Originated Paging

When the EPC has data to send, it pages the UT to request RRC connection establishment.

Figure 12G:
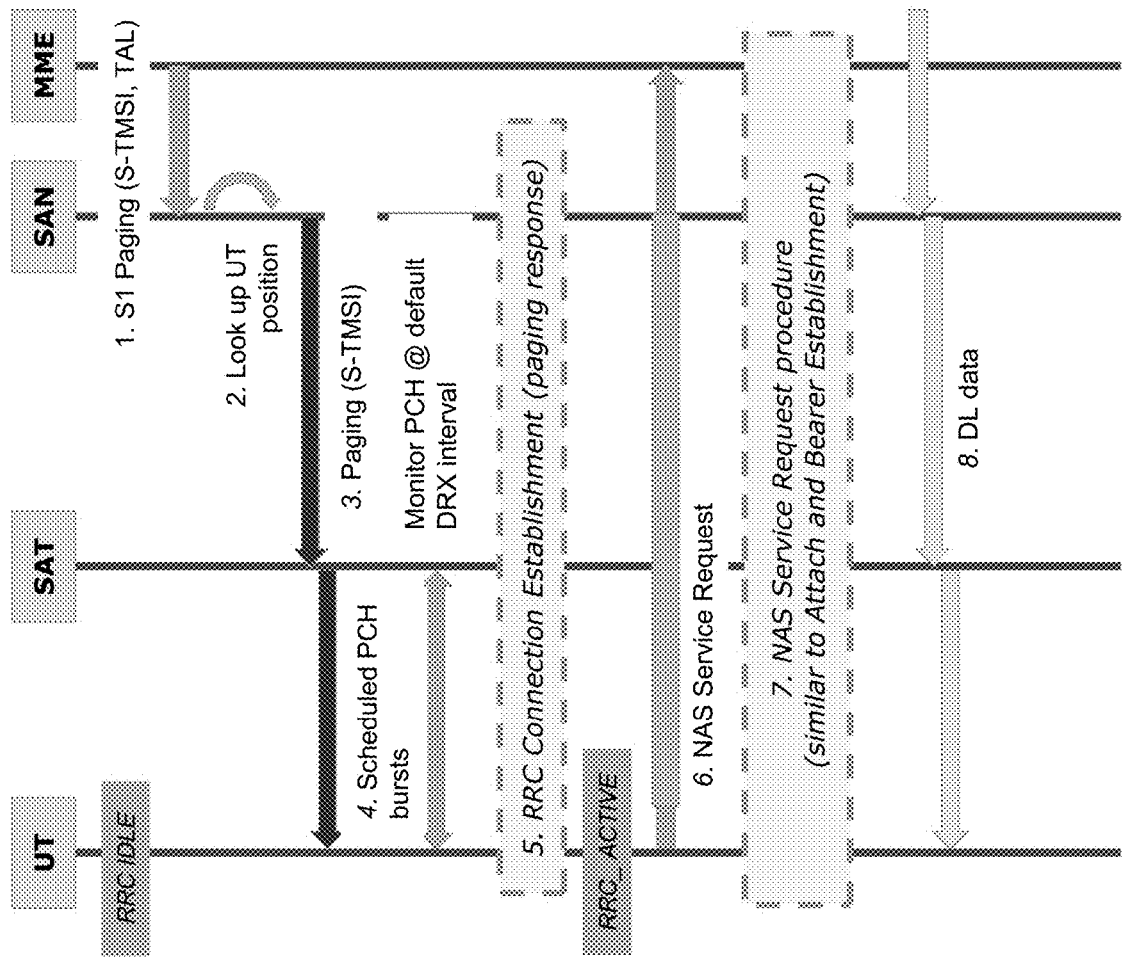
FIG. 12G depicts a signal flow diagram illustrating RRC EPC originated paging, according to example embodiments.

FIG. 12G depicts a signal flow diagram illustrating RRC EPC originated paging, according to example embodiments.

While in ECM_IDLE, the EPC (SGW) receives DL data for the UT and triggers the MME to initiate paging. The MME sends S1 PAGING to all the SAN-C's responsible for the TA. The message includes the UT temporary ID (S-TMSI) and TA list (TAL).

Only one of the paged SAN-C's will be selected to do the paging. The SAN-C looks up the last known location of that S-TMSI in the database and determines the satellites/beams which cover that location (by querying EDF).

The SAN-C sends paging requests to the SAN-R for each target satellite/beam with the S-TMSI and default DRX interval for the UT.

SAN-R schedules paging messages on the PCH slots for the target UT depending on the current DRX interval and sends them to the UT via the RFT and satellite.

The UT is monitoring its paging opportunities based on the default DRX interval. It receives the S-TMSI based page and responds with a RRC Connection Establishment Request with cause "Paging Response". The RRC Connection Establishment completes and the UT initial context is set up.

The NAS Service Request is conveyed to the MME within the S1 Initial UE message at the conclusion of the RRC Connection Establishment.

The NAS Service Request procedure takes place. This is similar to the Attach procedure in that the NAS authentication and security procedures take place and the bearers are established.

When the E-RAB for the required EPC bearer context is established, the EPC (SGW) sends the queued downlink data that triggered paging.

UT Originated MC Activation

Figure 12H:
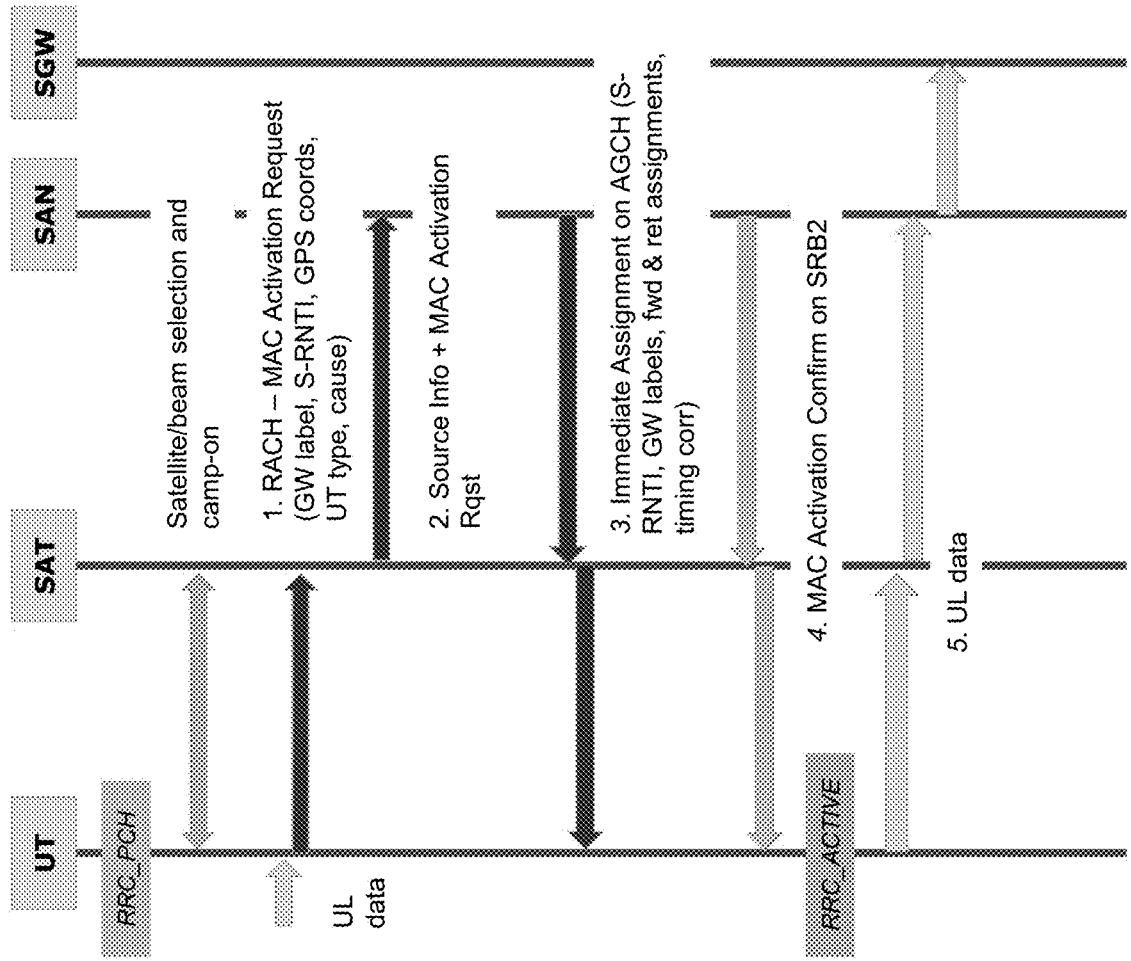
FIG. 12H depicts a signal flow diagram illustrating an RRC user terminal originated MAC activation, according to example embodiments.

When the UT has data to send, it requests MAC activation and transitions to RRC_ACTIVE FIG. 12H depicts a signal flow diagram illustrating an RRC user terminal originated MAC activation, according to example embodiments.

While in RRC_PCH, the UT needs to transmit uplink traffic so triggers the MAC Activation Request procedure. It transmits a MAC Activation Request on RACH with cause "UL data". The UT already knows its GW label (SAN-RC), so it adds it to the message.

Satellite receives the RACH, adds the source info (satellite, beam, carrier, frame, slot) and forwards to the SAN-RC (via ISL and the RFT).

SAN-RC processes the RACH, which includes looking up the TAI and beam/satellite trajectory for the current UT position. The S-RNTI in the message contains the logical SAN-C id. SAN-RC forwards the request with all this data to this SAN-C. SAN-C sends the Immediate Assignment on AGCH to the UT via the satellite. The Immediate Assignment contains the timing correction, forward timeslot assignment and MAC id, GW labels for RACH and traffic (SAN-R).

SAN-C Sends the MAC Activation Confirm message on SRB2 via SAN-U, SAN-R, RFT and satellite to the UT. This contains the MAC layer parameters for the UT, and other parameters needed in connected state. This includes information about upcoming beam & satellite handovers.

UT starts monitoring the downlink channel for its assigned slot. When it receives an uplink allocation, it sends the uplink data.

SAN Originated Paging

When the SAN has data to send, it pages the UT to request MAC activation

Figure 12I:
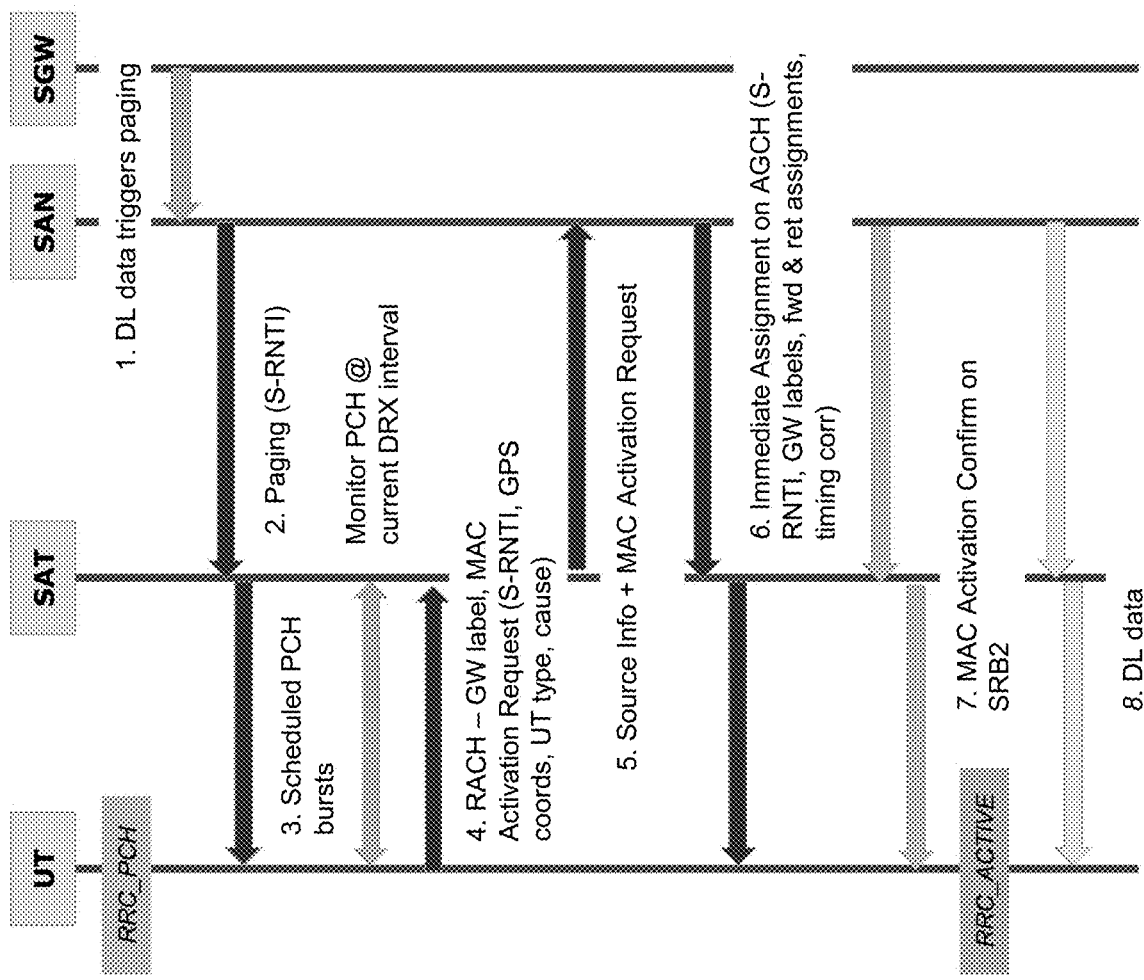
FIG. 12I depicts a signal flow diagram illustrating an RRC SAN originated paging, according to example embodiments.

FIG. 12I depicts a signal flow diagram illustrating an RRC SAN originated paging, according to example embodiments.

While in RRC_PCH, the GW receives DL data from the EPC (SGW). The SAN-U queues the data and requests the SAN-C to trigger paging.

SAN-C determines the satellites/beams to be paged based on the last known UT position (by querying EDF). It sends paging requests to the SAN-R with the S-RNTI and current DRX interval for the UT.

SAN-R schedules paging messages on the PCH slots for the target UT depending on the current DRX interval and sends them to the UT via the RFT and satellite.

The UT is monitoring its paging opportunities based on its current DRX interval. It receives the S-RNTI based page and responds with a MAC Activation Request with cause "Paging Response". The UT already knows its GW label (SAN-R), so it adds it to the message.

Satellite receives the RACH, adds the source info (satellite, beam, carrier, frame, slot) and forwards to the SAN-R (via ISL and the RFT).

SAN-R processes the RACH, which includes looking up the TAI and beam/satellite trajectory for the current UT position. The S-RNTI in the message contains the logical SAN-C id. SAN-R forwards the request with all this data to this SAN-C. SAN-C sends the Immediate Assignment on AGCH to SAN-RC. SAN-RC forwards it to the UT via the satellite. The Immediate Assignment contains the timing correction, forward timeslot assignment and MAC id, GW labels for RACH (SAN-RC) and traffic (SAN-RU).

SAN-C Sends the MAC Activation Confirm message on SRB2 via SAN-U, SAN-R, RFT and satellite to the UT. This contains the MAC layer parameters for the UT, and other parameters needed in connected state. This includes information about upcoming beam & satellite handovers.

UT starts monitoring the downlink channel for its assigned slot. The SAN-U sends the queued downlink data that triggered paging.

Differentiated Quality Of Service

System and Air Interface signaling supports multiple levels of QoS. Traffic classes supported consistent with that defined in 4G LTE standards Conversational Class Streaming Class Interactive Class Background Class Weighted Fair Queuing (WFQ) based scheduling algorithms is proposed for QoS differentiation. Consistent treatment needed for good Quality of Experience (QoE) across the network. This includes UT-SAT link QoS SAT-SAT QoS SAT-GW QoS Backbone QoS Route Management Route management in the system is proposed to be based on a Route Determination Function (RDF) in the gateway. The RDF determines the route that a packet has to take through the constellation so that it is transmitted in the appropriate user link downlink that the user terminal is communicating on. The basic principles of route management is as follows and shown in Figure RM-1:

UT provides its position to satellite

Figure 13A:
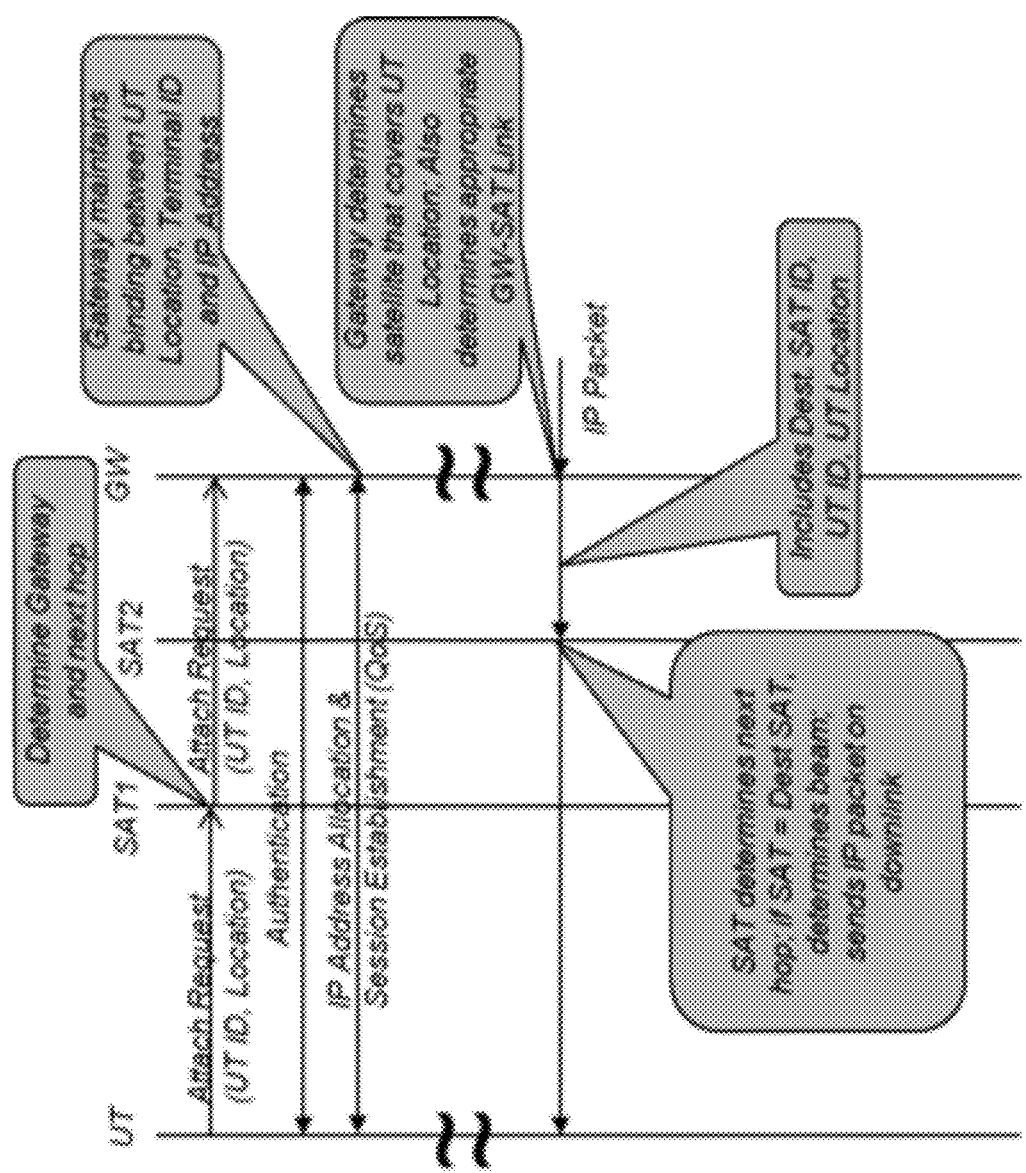
FIG. 13A depicts a signal flow diagram illustrating a route management determination, according to example embodiments.

Satellite forwards to appropriate Gateway based on UT position and/or Traffic Engineering rules UT position also provided to Gateway Gateway has binding between UT ID, its IP address (S1-AP ID) and its last reported position In forward link, Gateway RDF determines the satellite that covers UT position FIG. 13A depicts a signal flow diagram illustrating a route management determination, according to example embodiments.

Route management is inherently tied to mobility management. As user terminals handover from beam to beam and satellite to satellite, the RDF has to update its routes. Mobility Management and Handover are described next.

Route Management Protocol

Routing Protocols:

All the routing/switching/forwarding mechanisms used to get packets between UT and PDN Includes layers 2 & 3

Figure 13B:
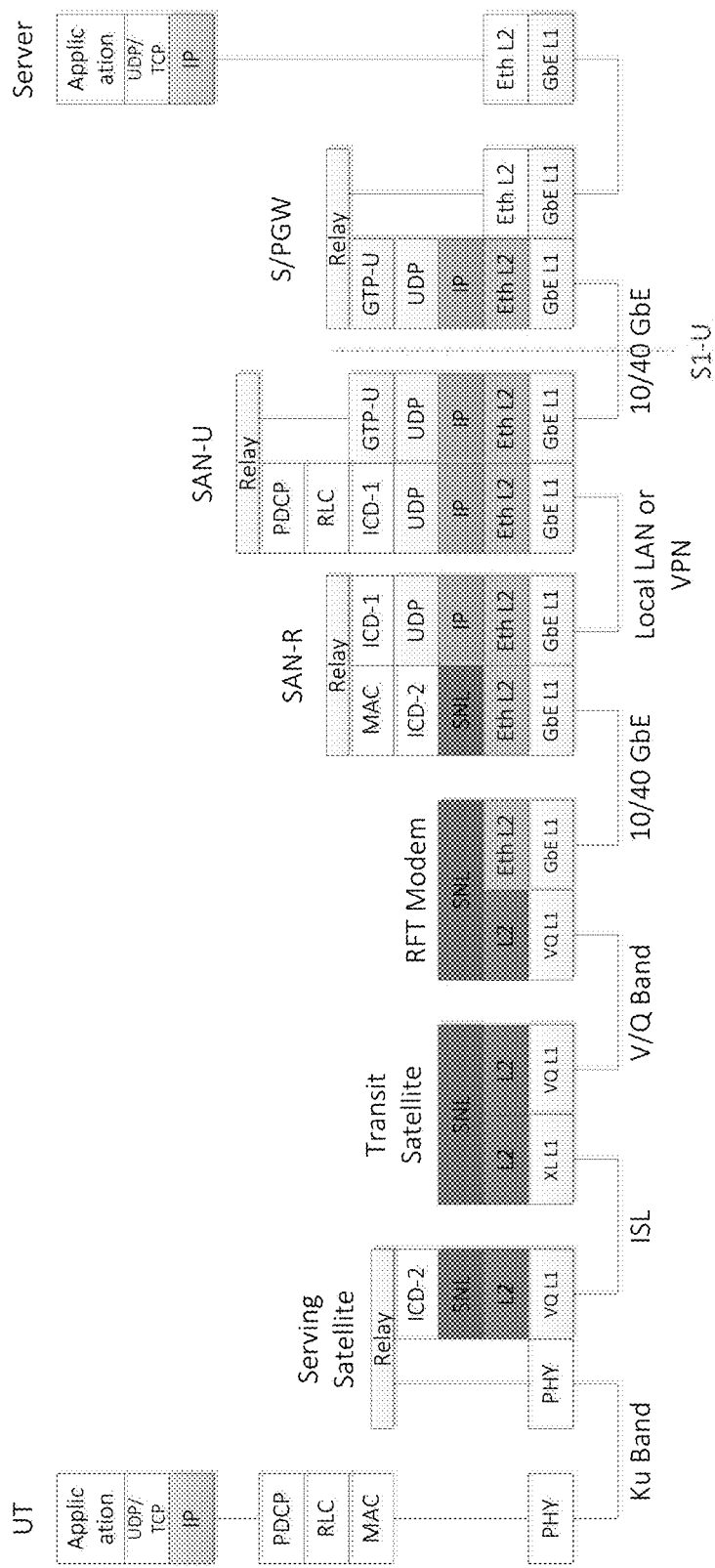
FIG. 13B illustrates an example end-to-end routing protocol stack structure, according to example embodiments.

FIG. 13B illustrates an example end-to-end routing protocol stack structure, according to example embodiments.

APN IP Domain

Refers to addressing used between UTs and servers in APN(s)

Private, public or combination

Figure 13C:
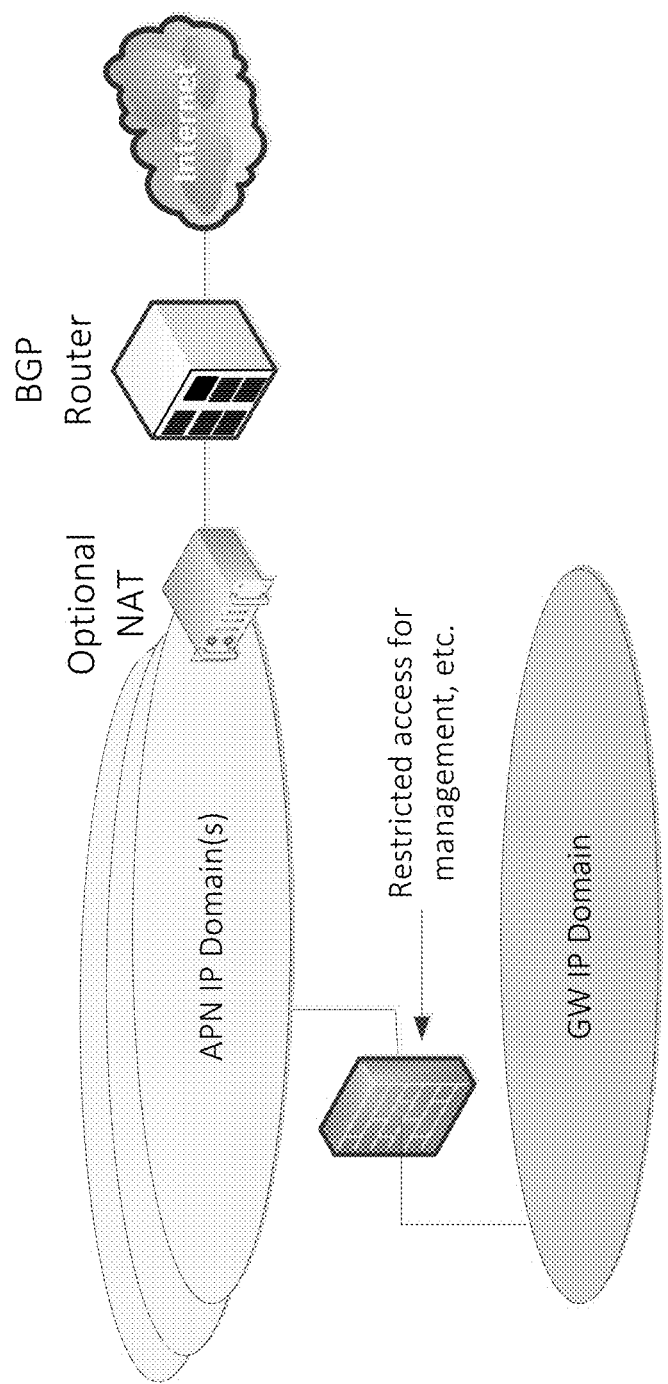
FIG. 13C illustrates an example APN IP network domain structure, according to example embodiments.
Figure 13D:
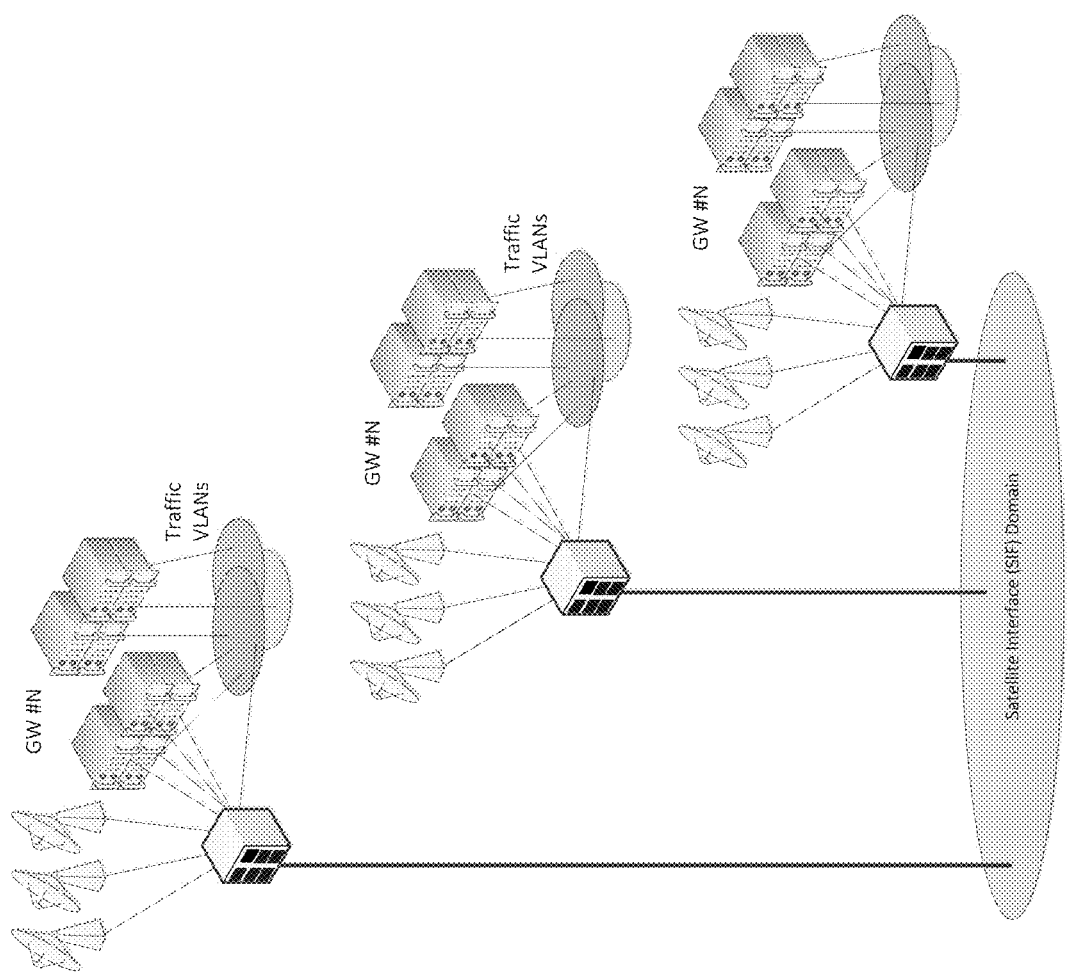
FIG. 13D illustrates an example satellite interface domain structure, according to example embodiments.
Figure 13E:
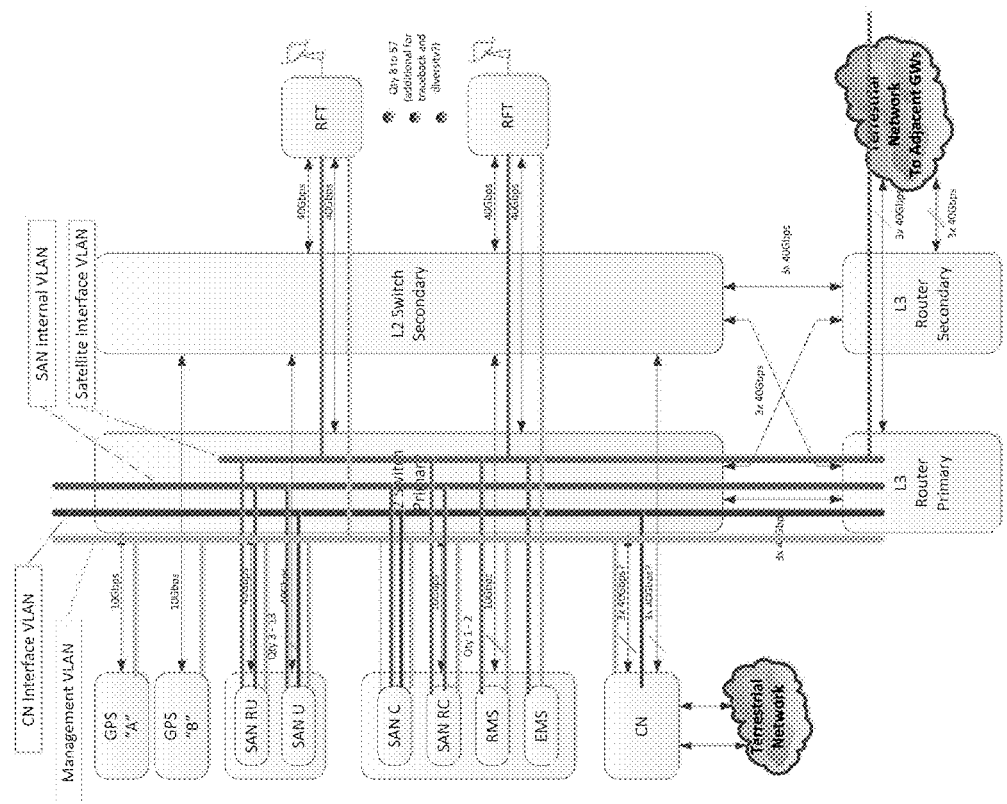
FIG. 13E illustrates an example gateway (GW) network domain structure, according to example embodiments.
Figure 14A:
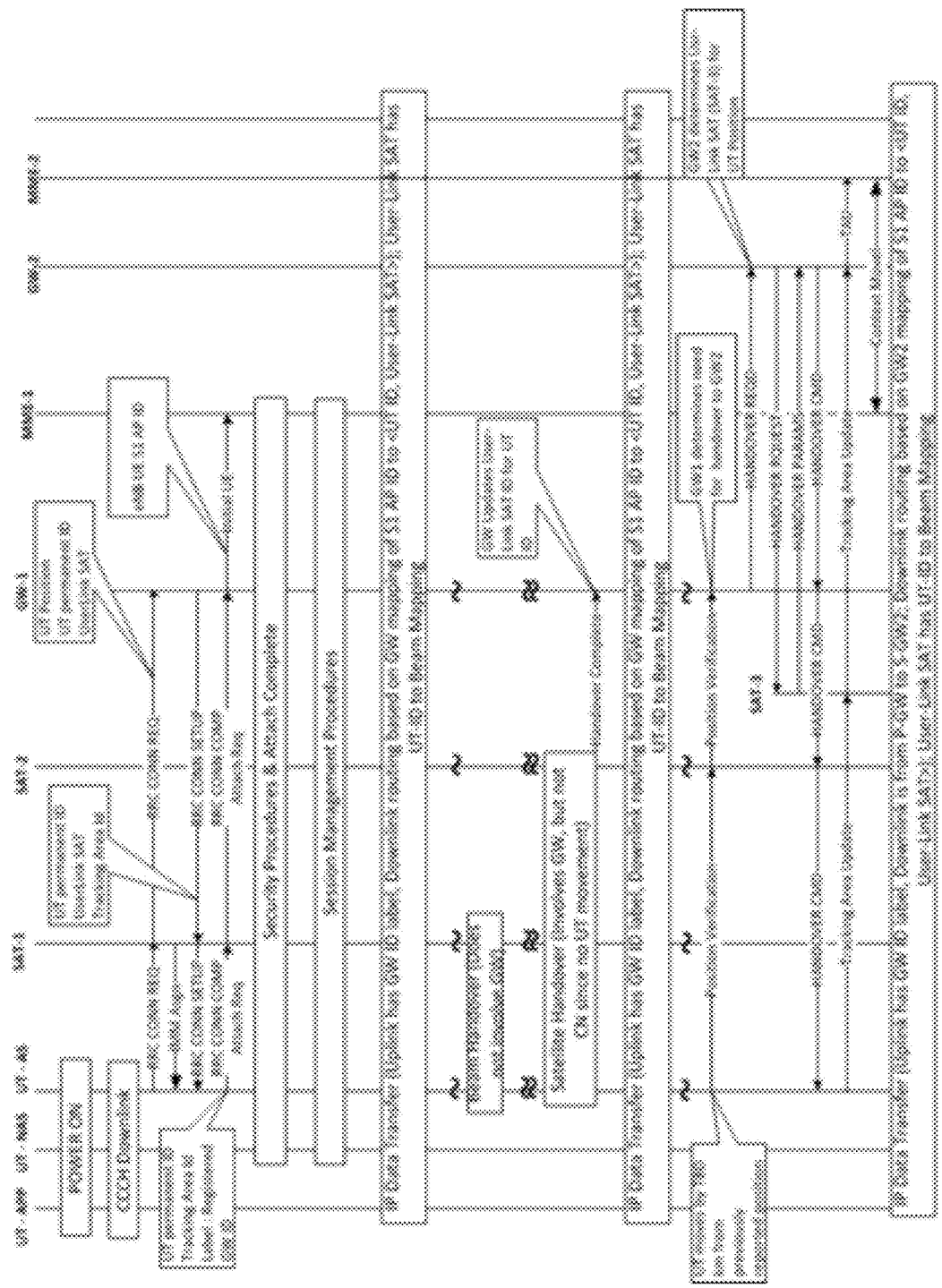
FIG. 14A depicts a signal flow diagram illustrating call flow messaging for initial registration and subsequent data transfer call phases, according to example embodiments.

Multiple APN domains isolated from each other and from GW internal IP domain
UT can be connected to multiple APNs at once
And simultaneously have an IP address in each one
NAT can be deployed in EPC P-GW
Interface to Internet/data center via BGP router
IPv4 or IPv6
UT IP address assigned by P-GW
P-GW can assign from a private pool and perform NAT
Can assign pools per APN
Completely isolated from GW internal IP domain
User IP packets are tunneled over end-to-end EPC bearers
Endpoints are P-GW and UT
FIG. 13C illustrates an example APN IP network domain structure, according to example embodiments.
GW IP Domain
   Refers to addressing used for IP communication between GW components
   Private IP address space, e.g. 10.x.x.x
      Subdivided by site (GW, NOC, etc.)
      Further subdivided by functional group (management, user data, signaling, etc.)
   Isolated from end-user (APN) address domain(s)
      Firewalled access possible for management, support, etc.
GW Ethernet Domain
   Refers to Ethernet switching layer used to interconnect GW components
   Subdivided into individual collision domains:
      SIF (Satellite Interface) domain
         Used to interface to satellite constellation via RFTs
         Interconnects neighbor GWs by means of L2VPNs
      Traffic VLANs
         VLANs used to segregate other types of traffic, e.g.
            SAN-R to SAN-U traffic
            SAN-U to EPC traffic
            EPC to APN traffic
            Management traffic
FIG. 13D illustrates an example satellite interface domain structure, and FIG. 13E illustrates an example gateway (GW) network domain structure, according to example embodiments.
Mobility Management
   For mobility management, it is assumed that
      Every given orbit has to be seen by two or more geographically diverse gateways
      For normal operation, while one gateway suffices, two gateways are required for situations where one of them fails or in a deep rain fade zone
   At power ON,
   if no prior constellation ephemeris information is stored in UT,
      UT scans for best possible signal quality within the [+/−57 degree elevation]
      UT picks best satellite in view
      User terminal sends Channel Request on access channel with GPS location to the selected satellite after reading system information; it also sends measurement report of the satellites in view
      SAT determines destination gateway based on policy (location, regulatory, traffic engineering etc.)
      If destination gateway not in the orbit,
         SAT sends it to closest Gateway
         Gateway (call it radio gateway) determines if there exists a satellite in the constellation that the UT can reach the intended gateway (that also meets the signal quality criterion)
         If so,
            Radio Gateway sends back a message to User Terminal about re-attempting on a different satellite (provides necessary parameters) that helps reach the intended gateway (this implies that a given gateway has information regarding the geographical coverage area of neighboring gateway)
            UT performs this request through the new satellite and registers via this gateway (call it registered gateway)
         If not,
            Radio Gateway creates a tunnel to the intended Gateway and forwards the RRC Connection Request to the intended Gateway (this becomes the Registered Gateway)
            RRC layer in Registered Gateway responds to UT via the Radio Gateway
            Gateway ID provided to the UT is the registered gateway. UT is also informed of the "Via" Gateway in this case
            Subsequent transmissions from UT will contain Via and Registered Gateway.
            If SAT can reach the Registered Gateway directly, then SAT forwards it to the registered gateway FIG. 14A depicts a signal flow diagram illustrating call flow messaging for initial registration and subsequent data transfer call phases, according to example embodiments.

Figure 14B:
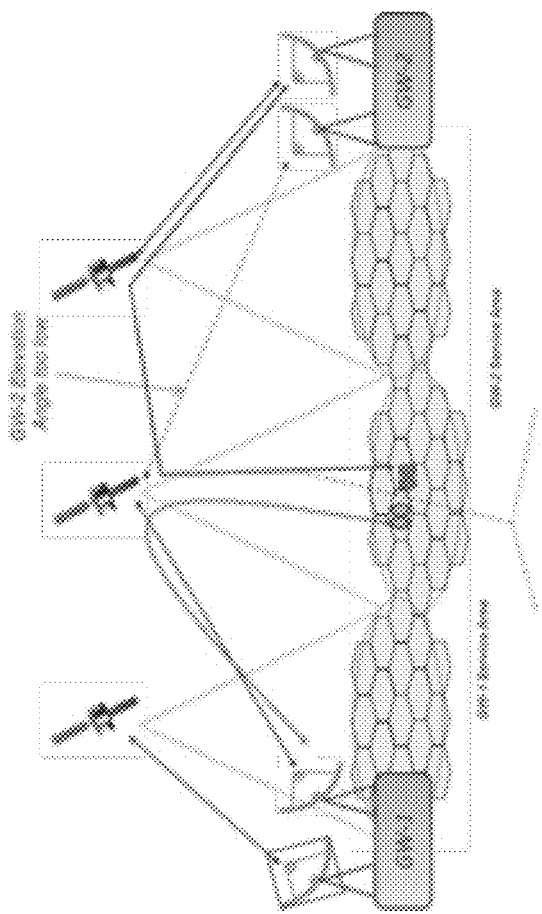
FIGS. 14B and 14C illustrate a routing change (not a handover) occurring in the satellite due to handover on the gateway link, according to example embodiments.
Figure 14C:
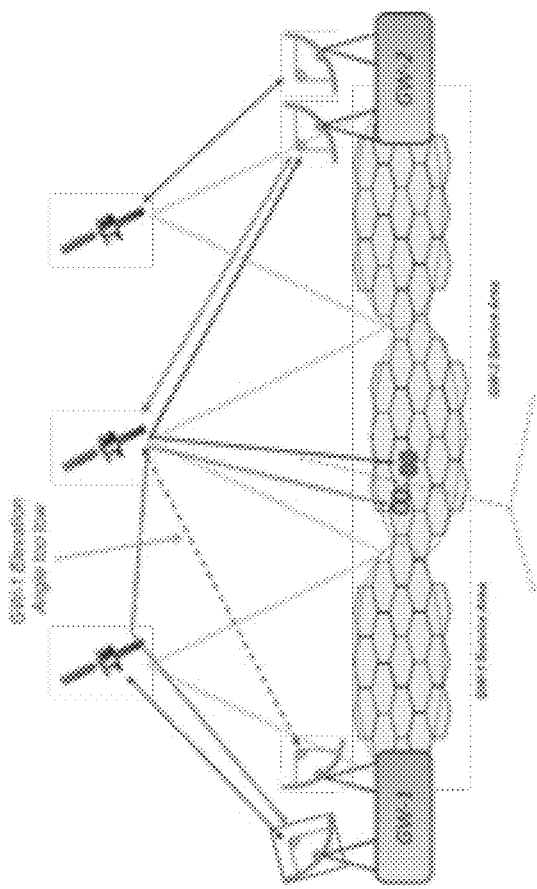
Figure 14D:
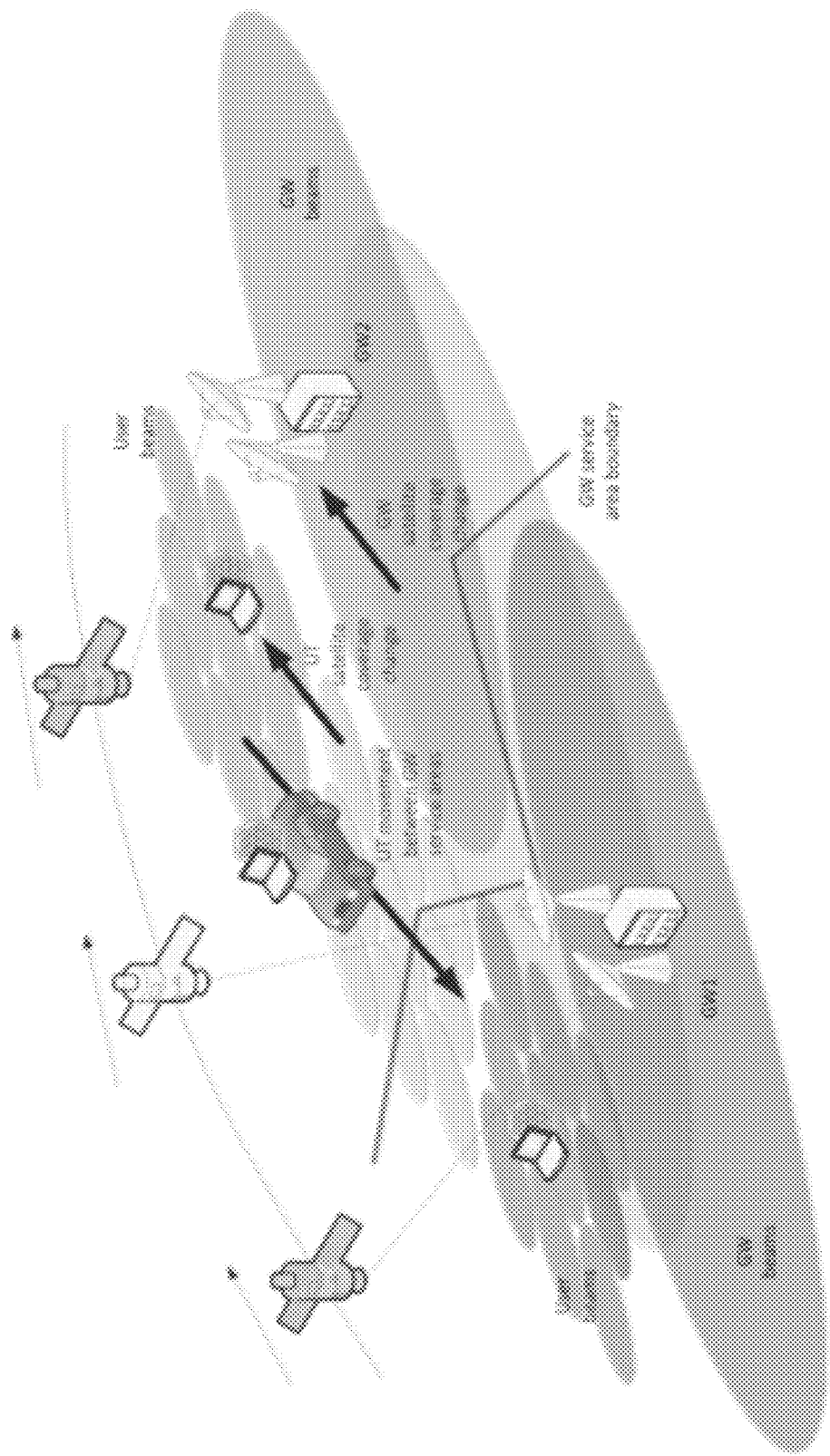
FIG. 14D illustrates a user terminal mobility management context structure, according to example embodiments.
Figure 15A:
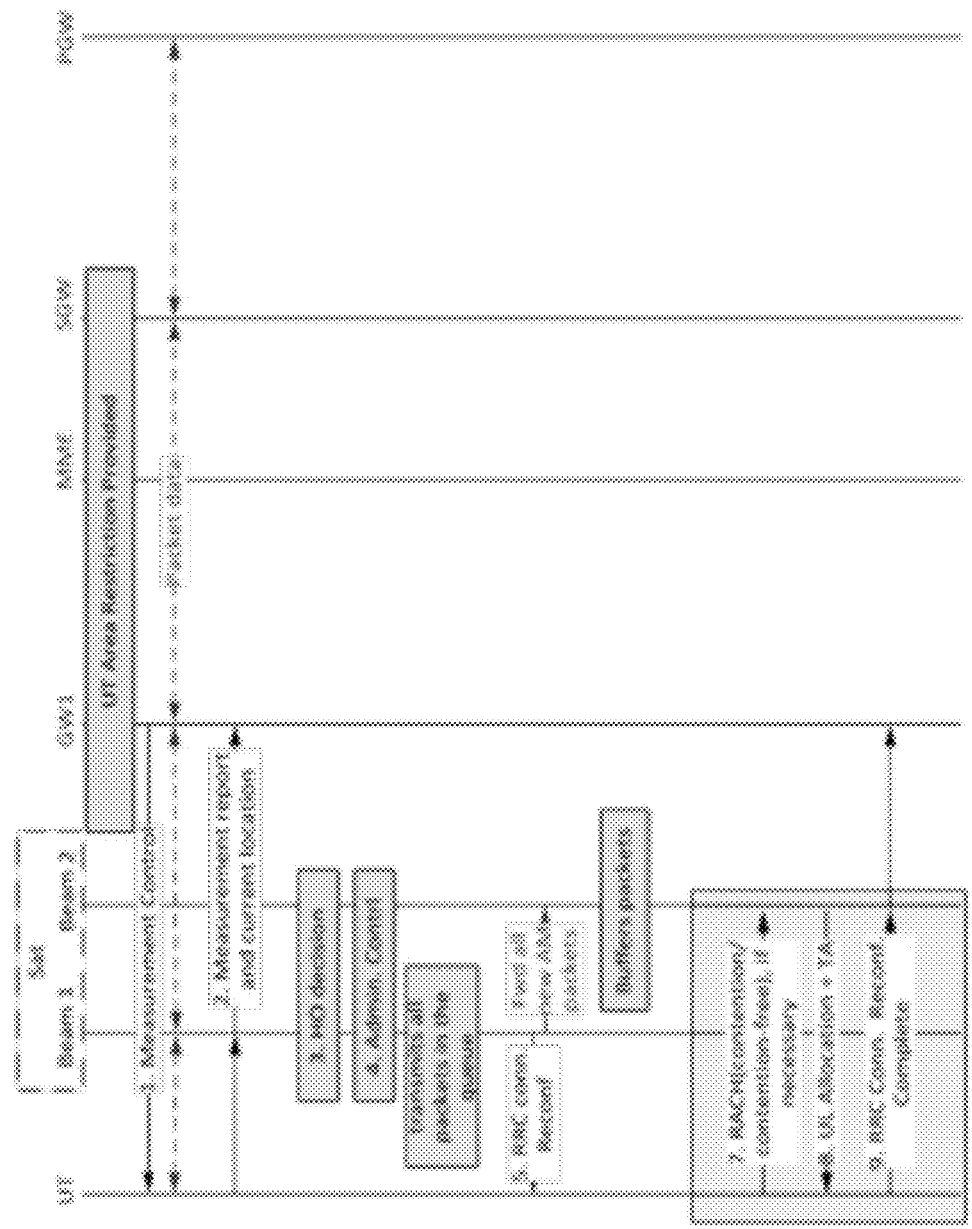
FIG. 15A depicts a signal flow diagram illustrating a beam to beam handover, according to example embodiments.
Figure 15B:
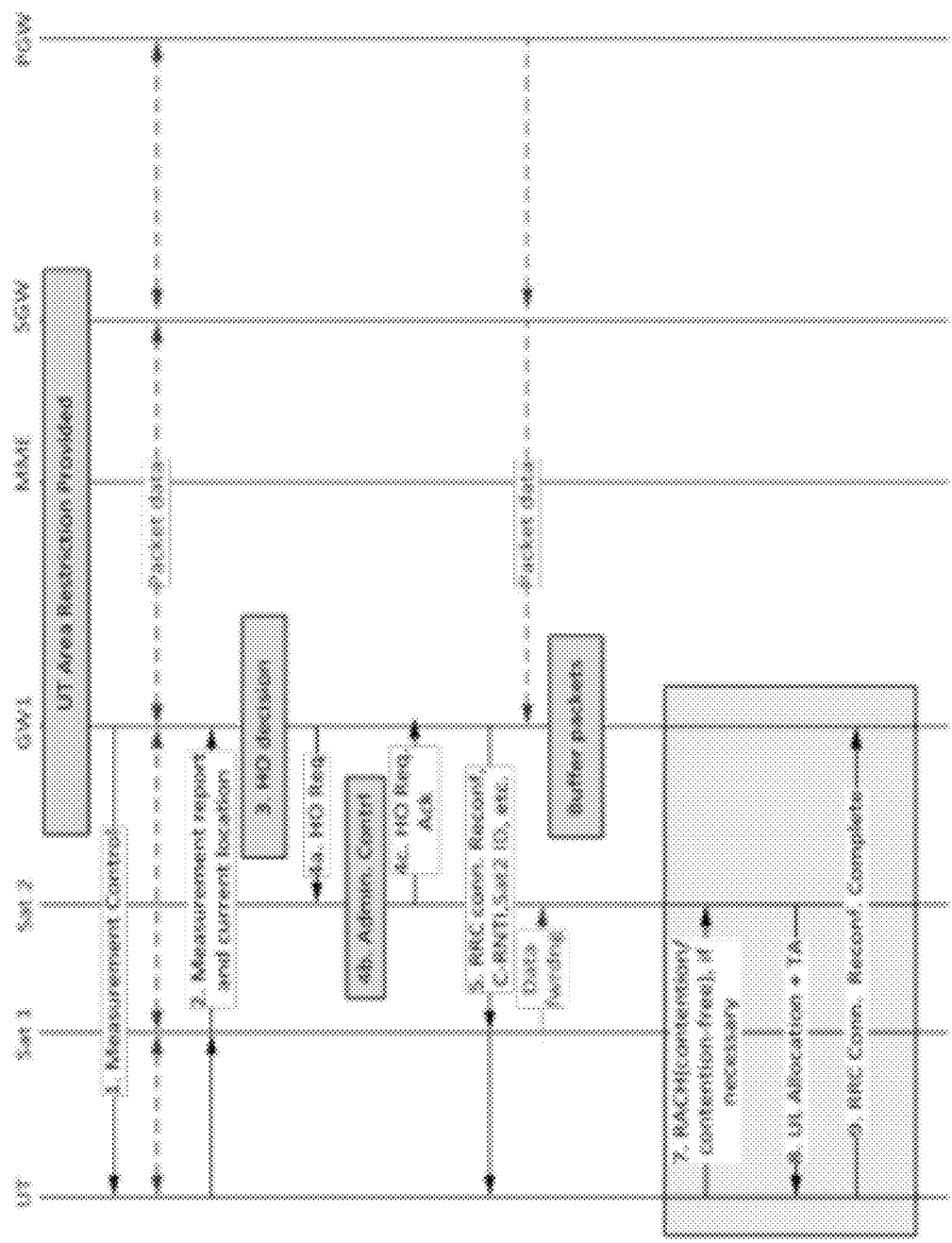
FIG. 15B depicts a signal flow diagram illustrating the preparation phase of a satellite to satellite handover, according to example embodiments.
Figure 15C:
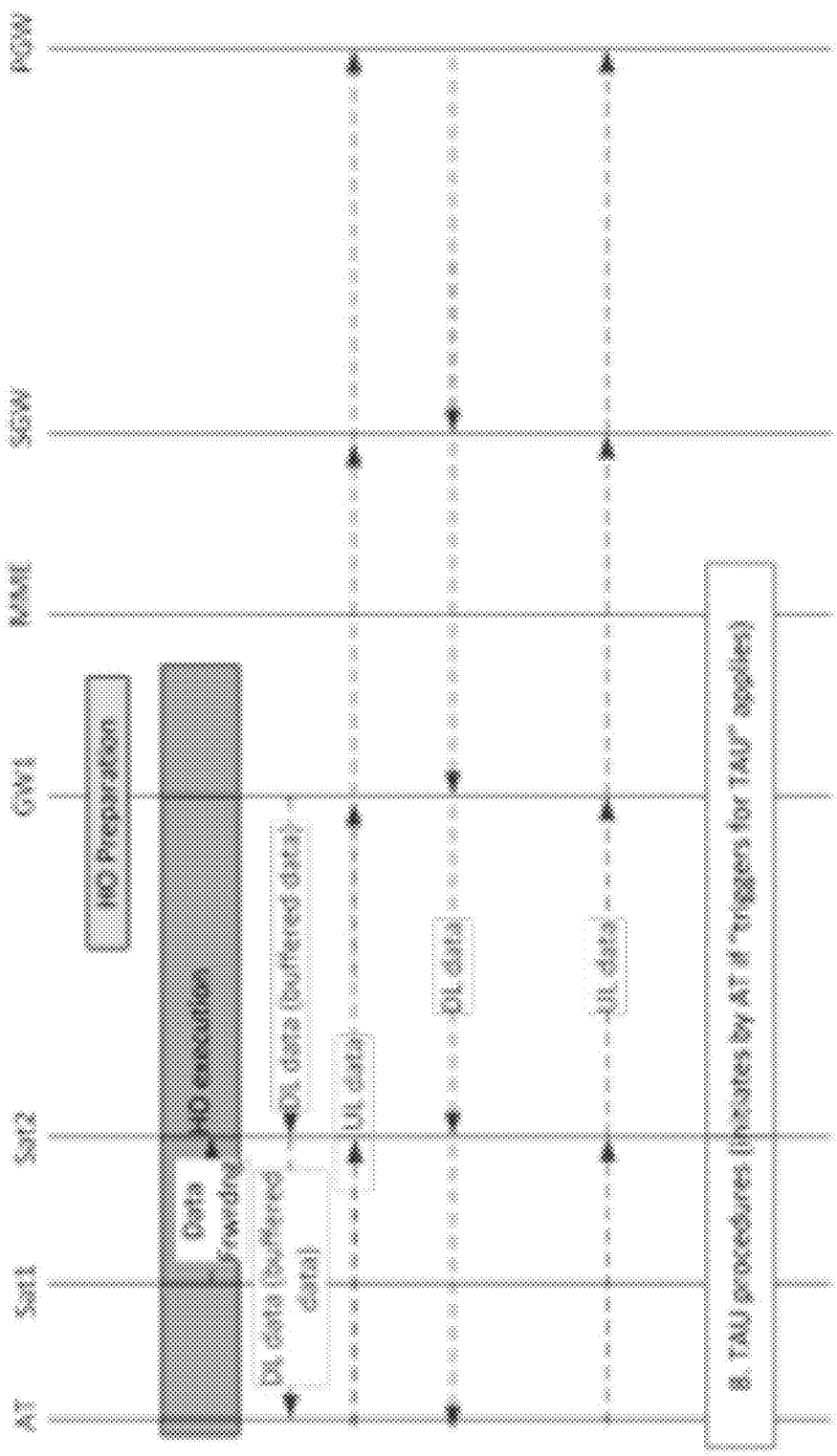
FIG. 15C depicts a signal flow diagram illustrating the data transfer phase of a satellite to satellite handover, according to example embodiments.
Figure 15D:
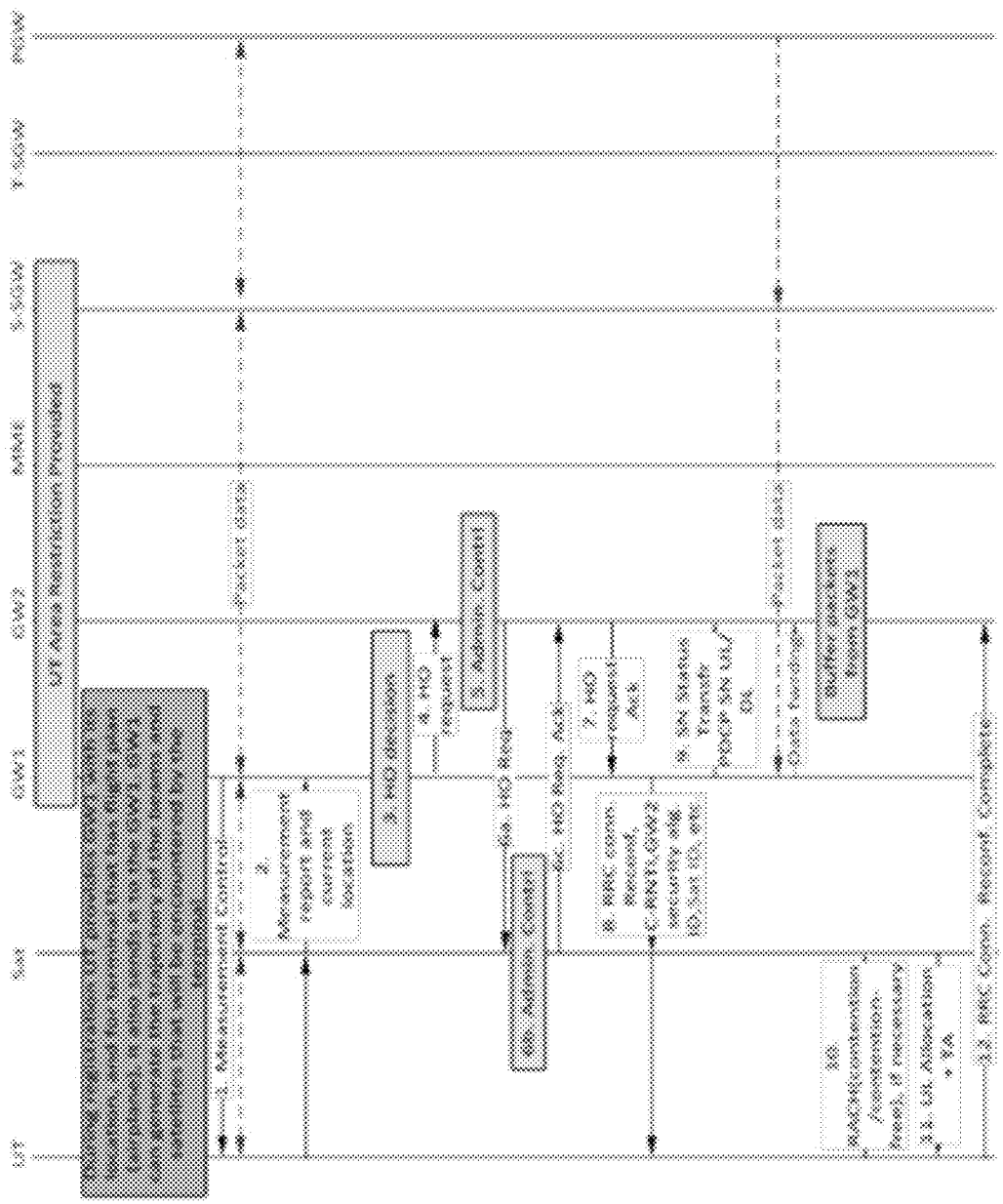
FIG. 15D depicts a signal flow diagram illustrating the preparation phase of a gateway to gateway handover, according to example embodiments.
Figure 15E:
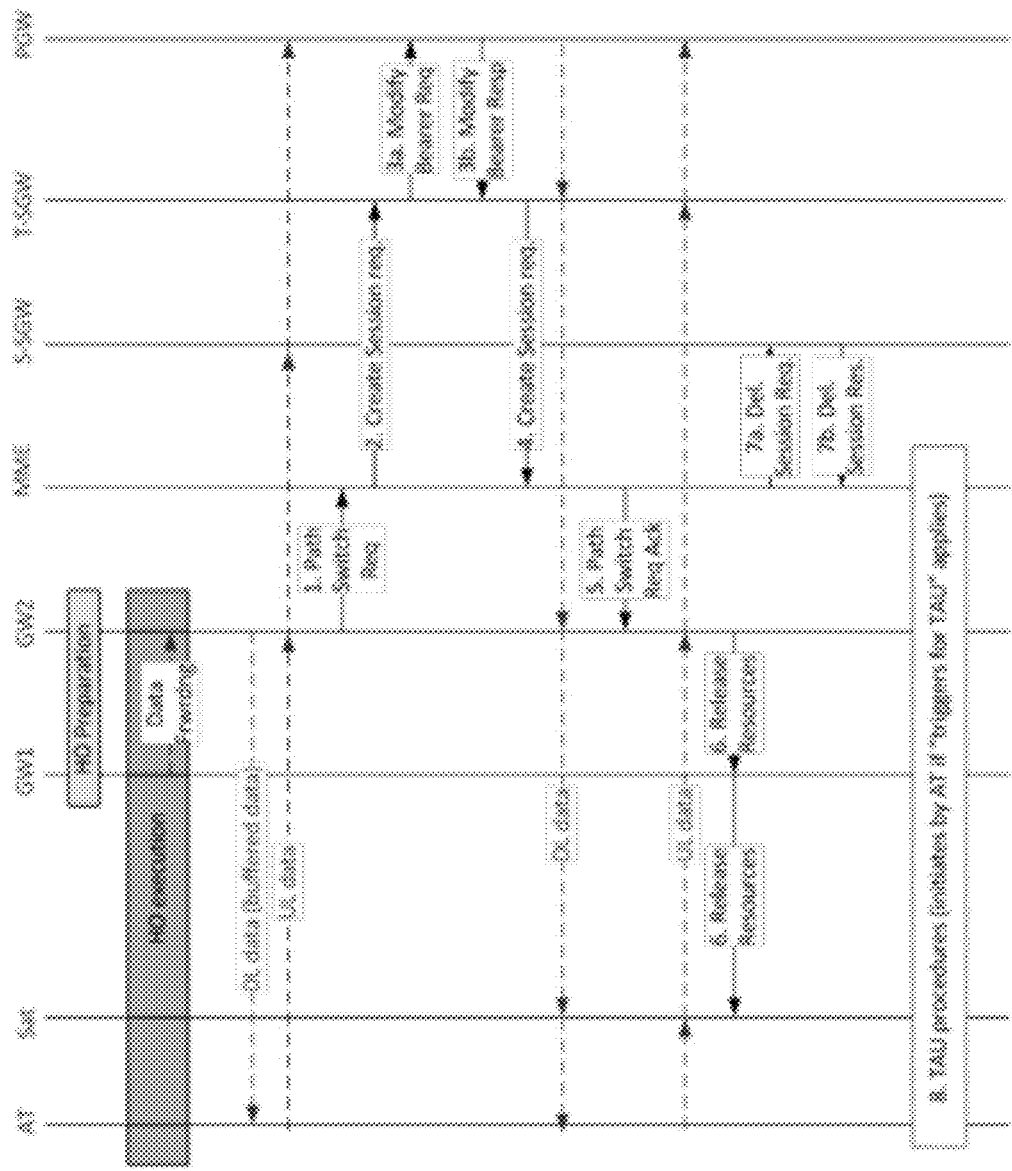
FIG. 15E depicts a signal flow diagram illustrating the data transfer phase of a gateway to gateway handover, according to example embodiments.
Figure 15F:
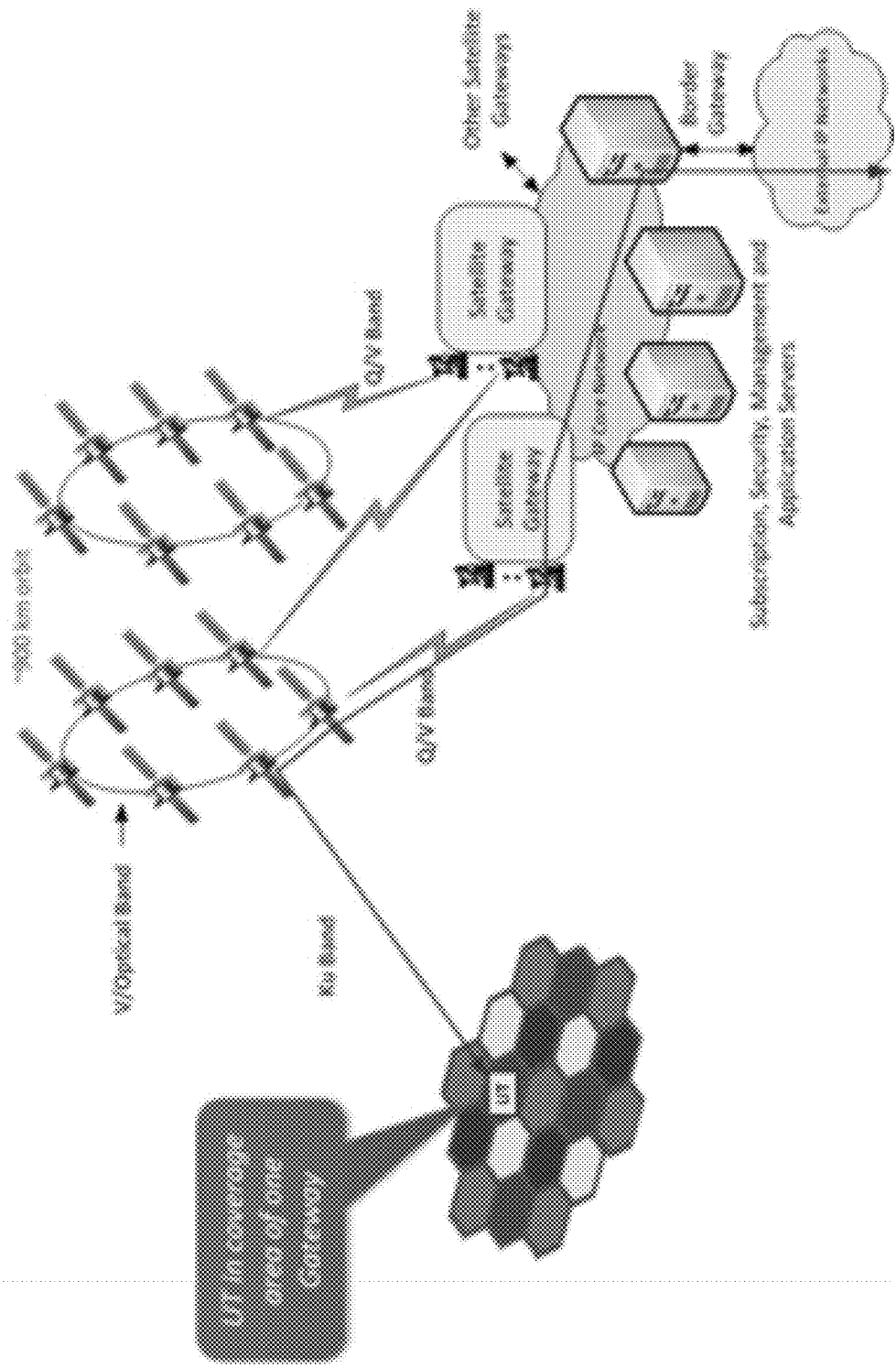
FIG. 15F illustrates a gateway to gateway handover, where the user terminal is at one gateway, according to example embodiments.
Figure 15G:
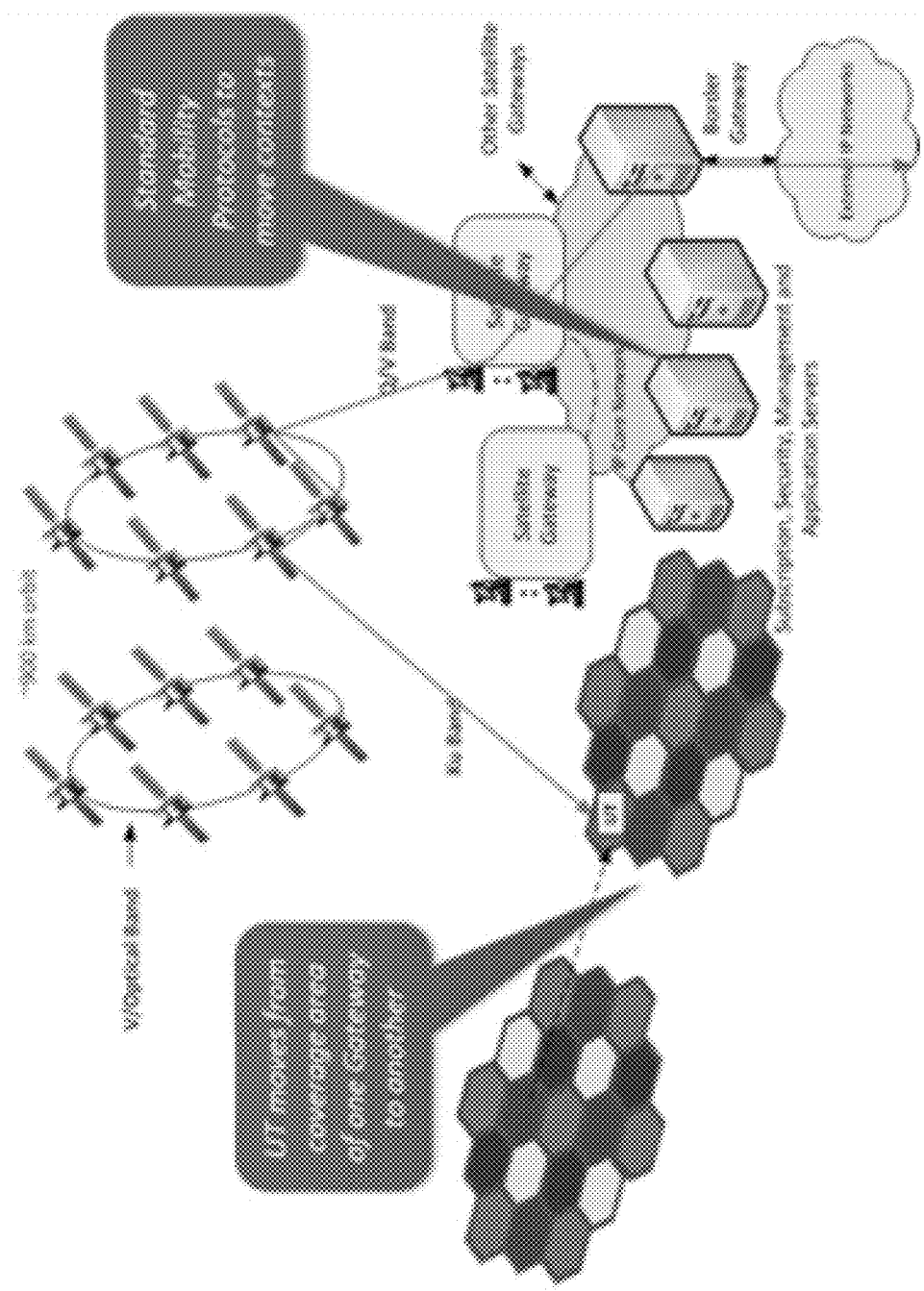
FIG. 15G illustrates a gateway to gateway handover, where the user terminal moves to another gateway, according to example embodiments.
Figure 15H:
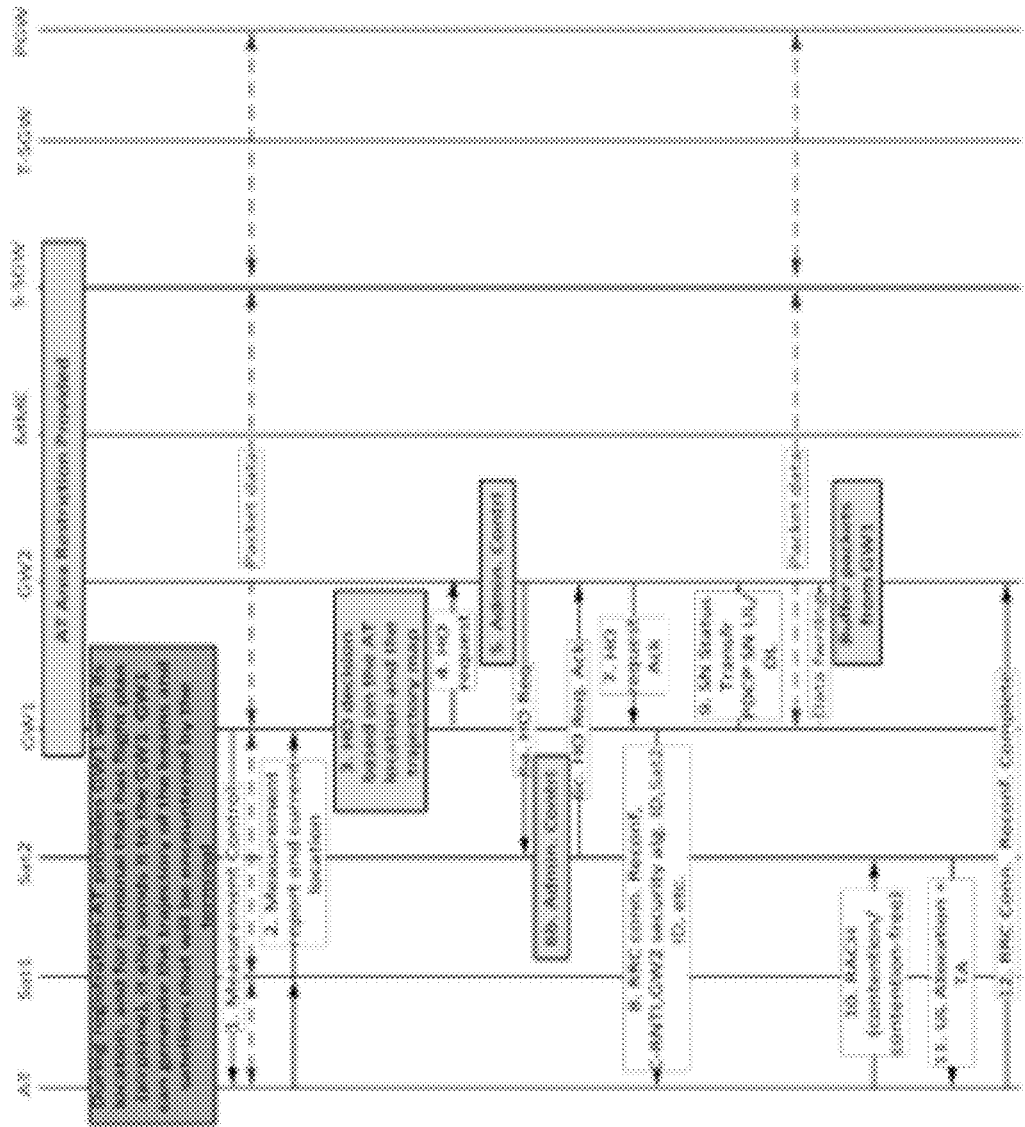
FIG. 15H depicts a signal flow diagram illustrating the preparation phase of a gateway to gateway handover with a satellite change, according to example embodiments.
Figure 15I:
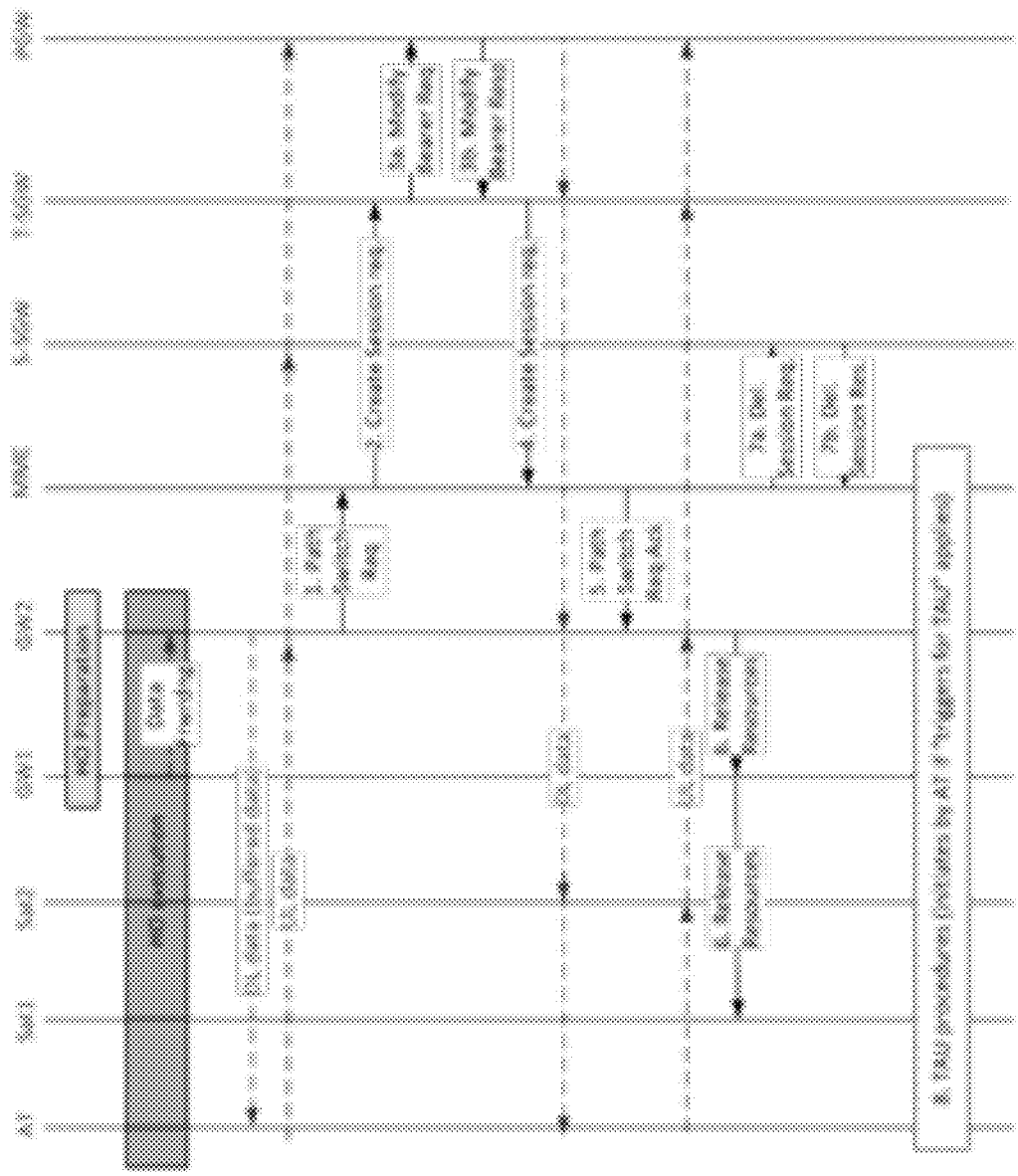
FIG. 15I depicts a signal flow diagram illustrating the data transfer phase of a gateway to gateway handover with a satellite change, according to example embodiments.
Figure 16A:
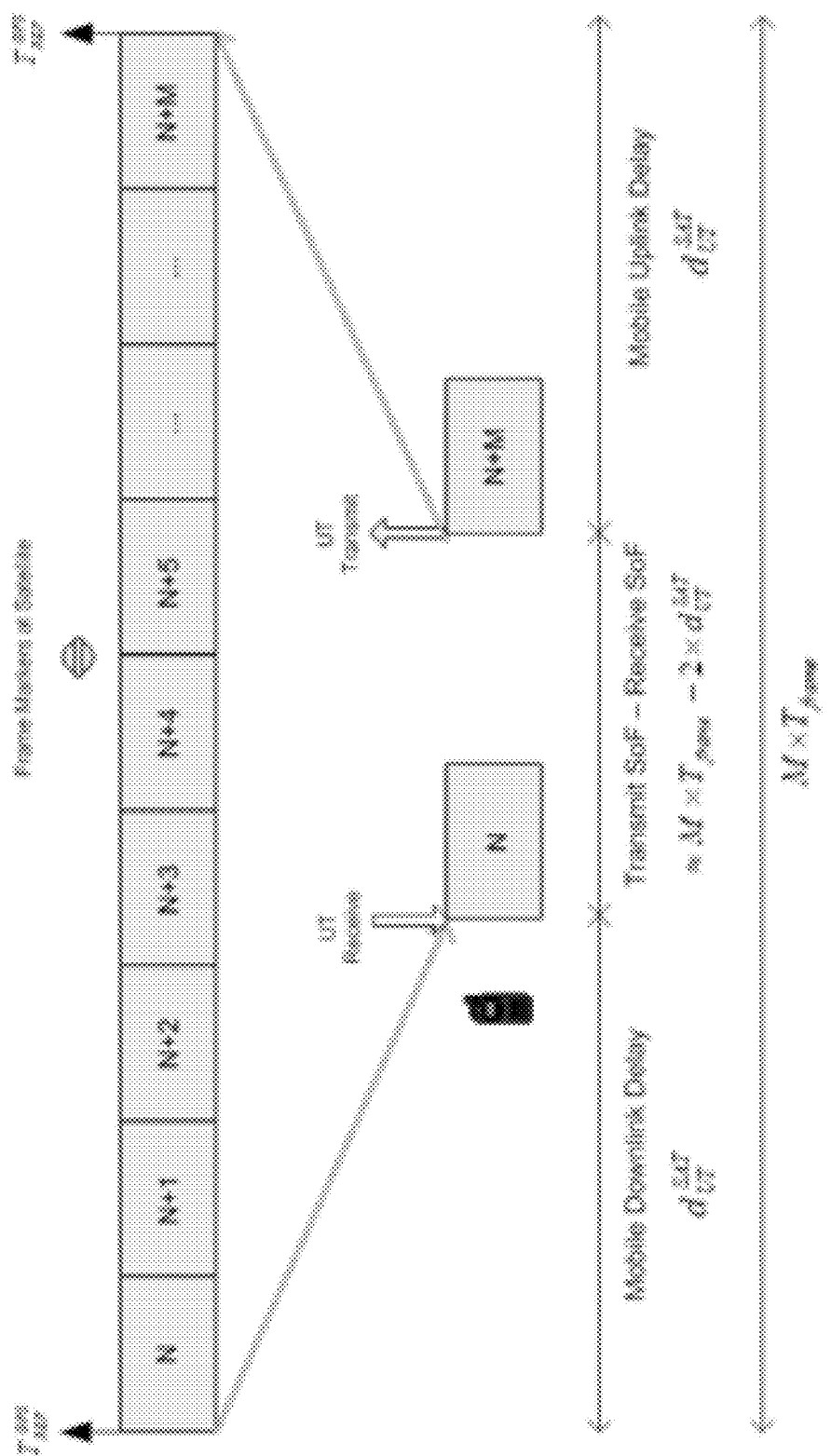
FIG. 16A illustrates a diagram of the return link timing and frame numbering synchronization, according to example embodiments.
Figure 16B:
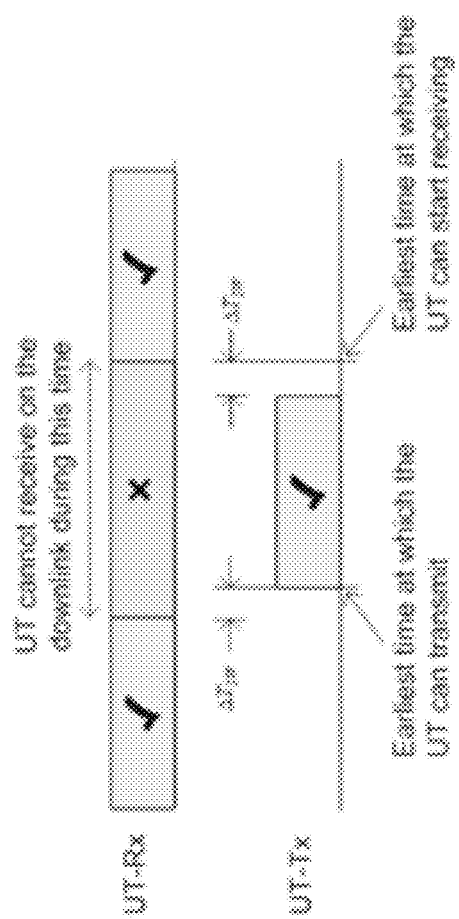
FIG. 16B illustrates a switching time for user terminal transition from receive to transmit, according to example embodiments.
Figure 16C:
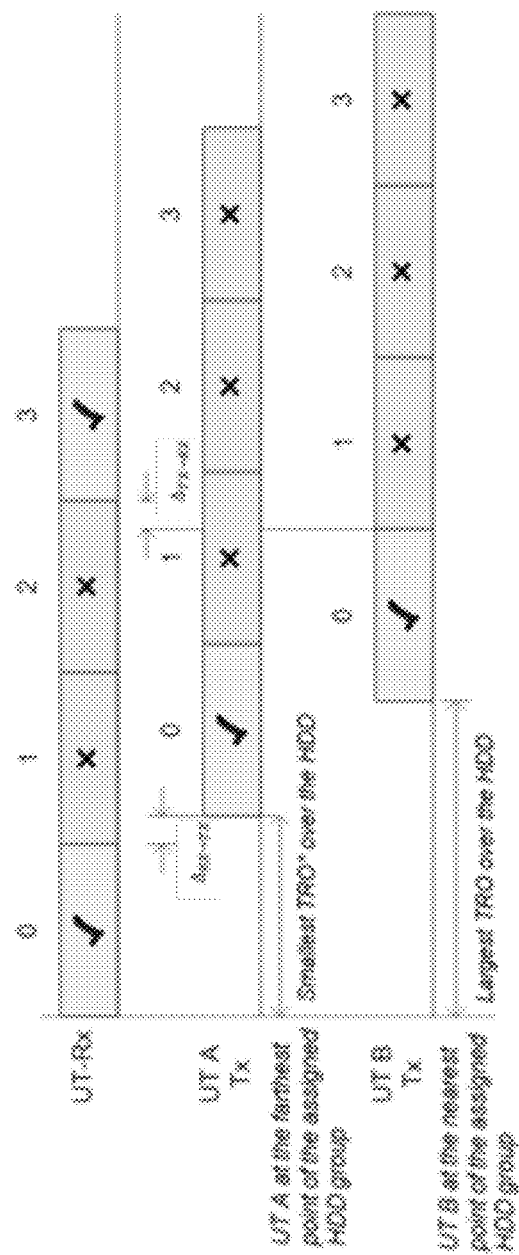
FIG. 16C illustrates synchronization for half duplex operation where the satellite coverage area on the ground is divided into multiple Half Duplex Divisioned (HDD) groups, according to example embodiments.

FIGS. 14B and 14C illustrate a routing change (not a handover) occurring in the satellite due to handover on the gateway link, according to example embodiments. In this case no handover occurs in the user link. The respective figures illustrate the following points.
   A given satellite beam may be providing service to two different gateways;
   Need for satellite to take appropriate switching decisions
   For normal traffic, this decision is aided by user terminal indicating the registered gateway in data that it transmits to satellite
   For terminals that are registering or re-registering, satellite determines the intended gateway
   Terminal remains connected to the gateway with which it has registered
   In general, a satellite may communicate with two gateways simultaneously
   There may be cases where a gateway is too low of an elevation angle; in that case cross link gets used to reach the intended gateway
   While a UT is in session, the satellite may move such that the gateway it is communicating is no longer visible to the satellite;
   In this case, there is no beam handover, no satellite handover, but there is an impact to the switching logic
   To accomplish this switch, satellites advertise reachability of Gateways to other satellites
   In addition, Gateways upload switching tables to satellite
UT States
   UT states determine what services a UT can get:
   UT states are defined in
      RRC Layer
      Non-Access Stratum (NAS) Layer
   RRC-Layer State
      RRC-IdleRRC-Active
      RRC-PCH NAS Layer State
  Evolved Packet System (EPS) Mobility Management (EMM) state
  EPS Connection Management (ECM) state
  EMM State
    EMM-Deregistered
    EMM-Registered
  ECM State
    ECM-Idle
    ECM-Connected
UT Mobility Management Context
  UT coverage change due to constellation movement
    Supported by Beam/Satellite HO
  Movement of UT within and between service areas
    Supported by Position Reporting, Tracking Area Update and GW-GW HO
  GW coverage change due to constellation movement
    Not addressed by RRC procedures, but by satellite network layer (SNL) routing
  FIG. 14D illustrates a user terminal mobility management context structure, according to example embodiments.
Handovers
  Each Gateway knows the satellites trajectories
  Each Terminal reports its location
  Based on the terminal location, Gateway estimates at what time the HO should be executed
    This can be done in advanced since Gateways knows the terminal location and the satellite movements
    Gateways sends Sat/beam HO trajectory to UT so that UT knows when the HO will happen
  MME involves in Gateway-Gateway HO since this HO requires path switch between EPC entities and the new Gateway
    Gateway-gateway HO mostly happens for moving terminal such as air plane
There are Several HO Scenarios Described Here
  Beam to Beam handover
  Satellite to Satellite Handover
  Gateway to Gateway Handover
  Beam to Beam Handover: FIG. 15A depicts a signal flow diagram illustrating a beam to beam handover, according to example embodiments.
  Satellite to Satellite Handover: FIG. 15B depicts a signal flow diagram illustrating the preparation phase of a satellite to satellite handover, and FIG. 15C depicts a signal flow diagram illustrating the data transfer phase of a satellite to satellite handover, according to example embodiments.
  Gateway to Gateway Handover (In this case, the satellite is the same, however gateway handover was necessary): FIG. 15D depicts a signal flow diagram illustrating the preparation phase of a gateway to gateway handover, and FIG. 15E depicts a signal flow diagram illustrating the data transfer phase of a gateway to gateway handover, according to example embodiments.
  High-level Gateway to Gateway Handover (with satellite change): FIG. 15F illustrates a gateway to gateway handover, where the user terminal is at one gateway, and FIG. 15G illustrates a gateway to gateway handover, where the user terminal moves to another gateway, according to example embodiments.
  Gateway to Gateway Handover (where the satellites also change)—The following uses X2 procedures similar to 4G LTE. Gateway to Gateway handovers involving S1 interface procedures may also be invoked if X2 interface is not available: FIG. 15H depicts a signal flow diagram illustrating the preparation phase of a gateway to gateway handover with a satellite change, and FIG. 15I depicts a signal flow diagram illustrating the data transfer phase of a gateway to gateway handover with a satellite change, according to example embodiments;
Traffic Shaping in Gateway to Manage Buffers in Satellite
  UT position is known in Gateway
    For a fixed UT, the antenna gain pattern changes as the satellite moves
      there could be 6 to 10 dB of gain variation
  Depending on the gain at a user location, Adaptive Coding and Modulation gets invoked in the forward link to that user in Ku-band user link
  This implies that the forward link throughout for a given user varies as the satellite moves
  When the throughput is low, the satellite would therefore need to buffer
  To minimize buffering requirements at the satellite, Gateway "shapes" the traffic to a given user based on user location
    Gateway reduces the rate at which transmits data to a given UT if Gateway determines that the user-link satellite antenna gain is low and vice-versa
      This is possible since gateway knows UT location and Gateway also knows the forward link beam gain of the user-link satellite
    This will therefore minimize buffering requirement at the user-link satellite
Flow Control Between Satellite and Gateway
  Traffic shaping helps minimize buffering requirement based on UT location and user-link satellite forward link gain.
  However there will be cases where the user link throughput has to be throttled depending on non-deterministic factors such as rain
  In this case, the buffers would start to grow in the satellite
  To better manage the depth of queues in the satellite, the user-link satellite implements a simple flow-control mechanism with the Gateway
  Here the user-link satellite will transmit the soft equivalent of RNR to Gateway
    This can be done on satellite basis, beam-by-beam basis or user-by-user basis
  When soft-RNR is received by the Gateway, the Gateway throttles the rate at which it injects data towards user-link satellite
Synchronization
  The speed of the LEO/MEO satellite as observed from a location on the earth is high. This high speed of the satellite results in a large satellite motion induced Doppler. The goal of the proposed synchronization scheme is to compensate for the large Doppler offset by exploiting the deterministic nature of the Doppler component.
Synopsis of the Proposed Scheme:
  Synchronization task at the GW is aided by the knowledge available at the GW of the LEO/MEO satellite ephemeris, and the positions of the GW and of the UT.
  Similarly, the UT is equipped with the knowledge of the LEO/MEO satellite ephemeris and its position as well.
  To achieve the latter, the LEO/MEO satellite ephemeris is broadcast by the GW on the forward link
  Compared to an alternate scheme in which the predictable and deterministic nature of the LEO/MEO satellite Doppler component is not taken advantage of, the proposed synch approach:
    incurs a small increase in the broadcast message overhead (due to the provision of broadcasting the LEO/MEO satellite ephemeris), while providing an increased efficiency in
  the UT's forward link signal acquisition and handover measurement processes,
    the Paging messaging transmission from the GW and the reception at the UT, and
  GW's return link signal acquisition and handover measurement processes
These increased efficiencies translate to
Faster times at the UT and at the GW for signal acquisition and for satellite-to-satellite handover,
a quicker response by the UT to the GW's Paging messages,
an improvement in the UT's battery life (e.g., since the UT in the idle mode can be in the sleep mode in between the assigned paging frames, and also because the satellite/cell search is more efficient)
a reduction in the satellite power and bandwidth consumed to send Paging messages to the UTs, and
a reduced complexity of the GW and the UT acquisition and tracking receivers
User link may be in one of the following states:
Cold Start
  Limited availability of satellite ephemeris, resulting in large uncertainties in Doppler and timing
  May require at the transmitter either (i) dedicated pilot/FCCH channel, or (ii) a large preamble followed by a small message packet (e.g., RACH). Similarly a receiver design with large acquisition window is needed
Warm Start
  Satellite ephemeris is available but may not have been recently updated
  Links in partially synchronized state
Steady State (Idle and Connected Mode Handovers)
  Accurate ephemeris, and estimates of delay and Doppler, is available on both the ends of the link
  Guard bands and acquisition windows are smallest
User Link—Forward link synchronization
Satellite and the UT both have a GPS disciplined oscillator
  Frequency reference is locked to GPS
  Frame markers derived based on GPS 1 pps timing ticks
  UT continually estimates the downlink delay and Doppler using the LEO/MEO satellite ephemeris data
Downlink Timing Acquisition at the UT
  By adding the estimated downlink delay to its GPS based 1 pps ticks, the UT derives an estimate of the downlink frame markers
  UT opens an acquisition window for the downlink frame timing around this estimated frame marker
    Acquisition window is largest at the cold start (may be continuous), smaller in the warm start, and smallest in steady-state.
Downlink Frequency Acquisition at the UT
  By adding the estimated downlink Doppler to its GPS disciplined frequency reference, the UT derives an estimate of the downlink frequency
  UT opens an acquisition window centered at this estimated downlink frequency
    Acquisition window is largest at the cold start (may be continuous), smaller in the warm start, and smallest in steady-state
  After the initial acquisition, the downlink timing and frequency are continually tracked by the UT receiver
User Link—Return link synchronization
UT adds Transmit Receive Offset (TRO) to the downlink timing and frequency to derive the uplink timing and frequency
TRO is dependent on the user link RTD (Round Trip Delay) and RTDop (Round Trip Doppler)
  TRO is initially self-computed by the UT given the knowledge of the satellite ephemeris and its GPS position
  A Closed Loop Correction (CLC) feature, such as the one in GMR-1, is necessary to prevent run-off conditions due to inaccuracies in the self-computed TRO at UT
  If the UT receives a TRO correction from the satellite in the CLC message, it extrapolates this last received TRO using the ephemeris data
  Therefore, in the steady state, the UT's return link transmissions are synchronized at the satellite
  A medium acquisition window preamble and a large acquisition window preamble would be useful to serve "corner cases" (warm/cold starts)
  To serve these cases, satellite transmits the beam center delay and Doppler
Frame Numbering and Synchronization
  FIG. 16A illustrates a diagram of the return link timing and frame numbering synchronization, according to example embodiments. The UT continually adjusts the Transmit Receive Offset (TRO) as shown.
Half Duplex Operation
  Half duplex terminals cannot simultaneously transmit and receive
    As shown below, a switching time $\Delta_{RX \to TX}$ is required for the UT to transition from the receive to transmit (and vice versa, $\Delta_{TX \to RX}$ is needed to switch from transmit to receive)
    A scheme for synchronization and resource allocation with the above constraint for the half duplex terminals is proposed
  FIG. 16B illustrates a switching time for user terminal transition from receive to transmit, according to example embodiments. The satellite coverage area on the ground is divided into multiple Half Duplex Divisioned (HDD) groups:
    Size of the HDD group is determined by the duration of the packets assigned to the UTs on downlink
    Return uplink resource is assigned to the terminals in a given HDD group such that
    Terminals at the edge of the HDD group nearest to the satellite end their uplink transmission $\Delta_{TX \to RX}$ seconds before the beginning of the downlink packet (see UT B Tx Timeline in the figure below)
    Terminals at the edge of the HDD group farthest to the satellite begin their uplink transmission $\Delta_{RX \to X}$ seconds after the end of the downlink packet (see UT A Tx Timeline in the figure below)
  FIG. 16C illustrates synchronization for half duplex operation where the satellite coverage area on the ground is divided into multiple Half Duplex Divisioned (HDD) groups, according to example embodiments. It can be shown that, for any given duration of the packet(s) assigned to the UT on the downlink, the proposed scheme maximizes the Half Duplex Resource Allocation Efficiency (HDRAE):
    HDRAE ($0 \leq HDRAE \leq 1$) is defined as the ratio of the time that the terminal is active (in either transmitting or receiving) over the interval of time that covers the UT's Rx→Tx→Rx transitions
    In the example on the previous slide, over the three units of time (0, 1 and 2) that cover UT's Rx→Tx→Rx transitions, the terminal is active over 2 units. Therefore, the HDRAE is 0.666. This is the maximum attainable HDRAE given that the downlink resource in this example occupies one unit of time.

Further, the HDRAE can be improved (such that it approaches the maximum value of unity) by increasing the duration of the packet resource assigned to the UT either on the downlink or on the uplink. Two alternative example implementations may be as follows:

- In one approach, the HDD groups are mapped to the formed beams on the ground
- Although this may lead to suboptimal HDD groups (especially for the beams larger in geographic size compared to the size of the HDD group), an advantage is that a common resource allocation rule can be applied for all the terminals in a given beam
- In an alternate approach, the HDD groups are defined independent of the beam. This requires the use of a "terminal-location-aware" scheduler at the Gateway
- The benefit of this approach is the use of optimally-defined HDD groups. A drawback is that this requires a more complex scheduler design at the GW (e.g., scheduler has to perform handover of a given terminal from one HDD group to the next as the satellite traverses in its orbit)

Gateway Synchronization Scheme

Figure 16D:
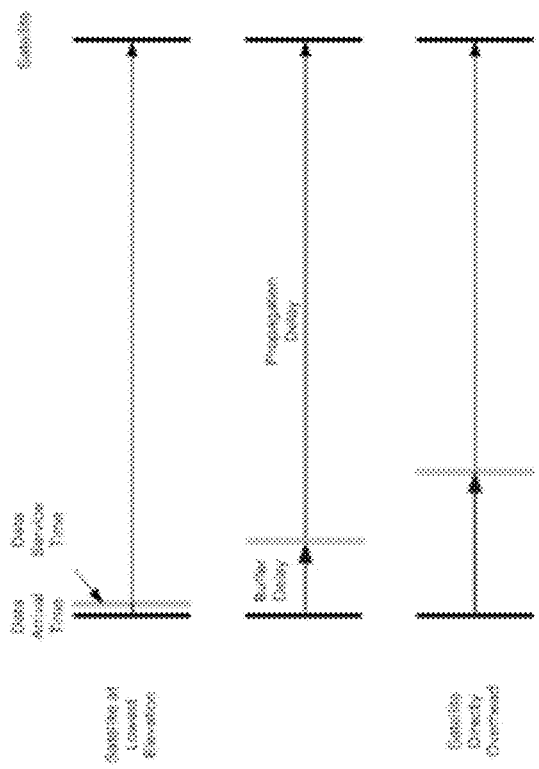
FIG. 16D illustrates gateway timing synchronization, according to example embodiments.
Figure 16E:
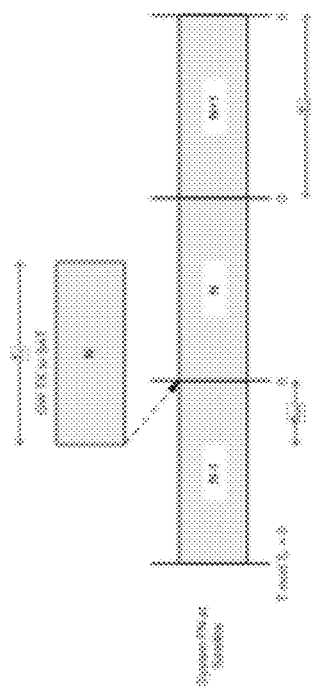
FIG. 16E illustrates a gateway frame numbering scheme for synchronization, according to example embodiments.

- On the forward link, the timing, frequency, and frame numbering of the frames transmitted by the GW are aligned at the satellite to a GPS-derived system reference
- GW continuously adjusts transmit timing and frequency of all the forward uplink transmissions to each LEO/MEO satellite to compensate for the feederlink delay and Doppler.
- GW calculates the required transmission offsets from the ephemeris data, and applies the calculated offsets to a system-level GPS derived synchronization reference signal FIG. 16D illustrates gateway timing synchronization, and FIG. 16E illustrates a gateway frame numbering scheme for synchronization, according to example embodiments.

UT-UT Direct Sessions

There may be some sessions that require direct communication between user terminals without passing through the gateway. In such a case, the Reassembly function of the RLC layer is selectively implemented in satellite for those sessions that require direct terminal to terminal communication without involvement of the Gateway. In this case, security contexts and keys have to be exchanged directly between two user terminals.

Gateway Architecture

Figure 17A:
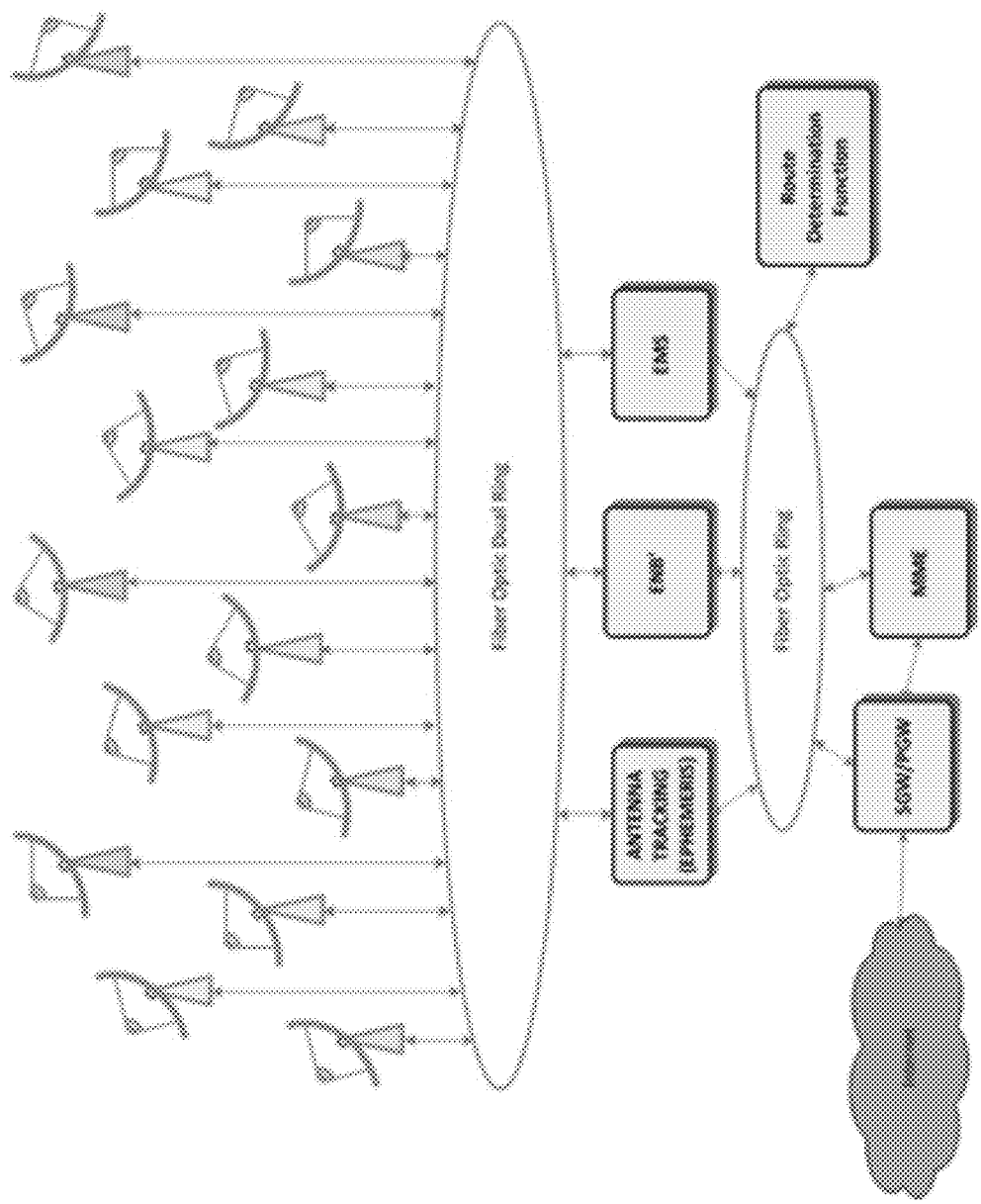
FIG. 17A illustrates an example gateway architecture, according to example embodiments.

Gateway architecture is based on 4G LTE radio network and core network architecture, modified for satellite environment. Here a Gateway has visibility to a number of LEO/MEO satellites depending on the location of gateway. Each Gateway has a number of tracking antennas in the V/Q band. FIG. 17A illustrates an example gateway architecture, according to example embodiments.

Tracking antennas have the necessary radio modulation and demodulation functions so that the baseband from multiple tracking antennas may be transported to eNB's via optical fiber link. This architecture therefore permits gateway diversity to mitigate rain propagation effects. A diverse set of tracking antennas may be placed several tens of miles away and the digital baseband signal can be hauled via fiber to the common eNB. SGW, PGW and MME are standard 4G LTE core network elements. As discussed earlier, a key component of the Gateway is the Route Determination Function (RDF) that is responsible for generating the appropriate labels for IP packets to be transmitted to user terminals communicating via the LEO/MEO constellation. This provides the centralized architecture providing clear separation between control and user plane functions. Various interfaces to the eNB' function of a given Gateway is shown in Figure below.

Figure 17B:
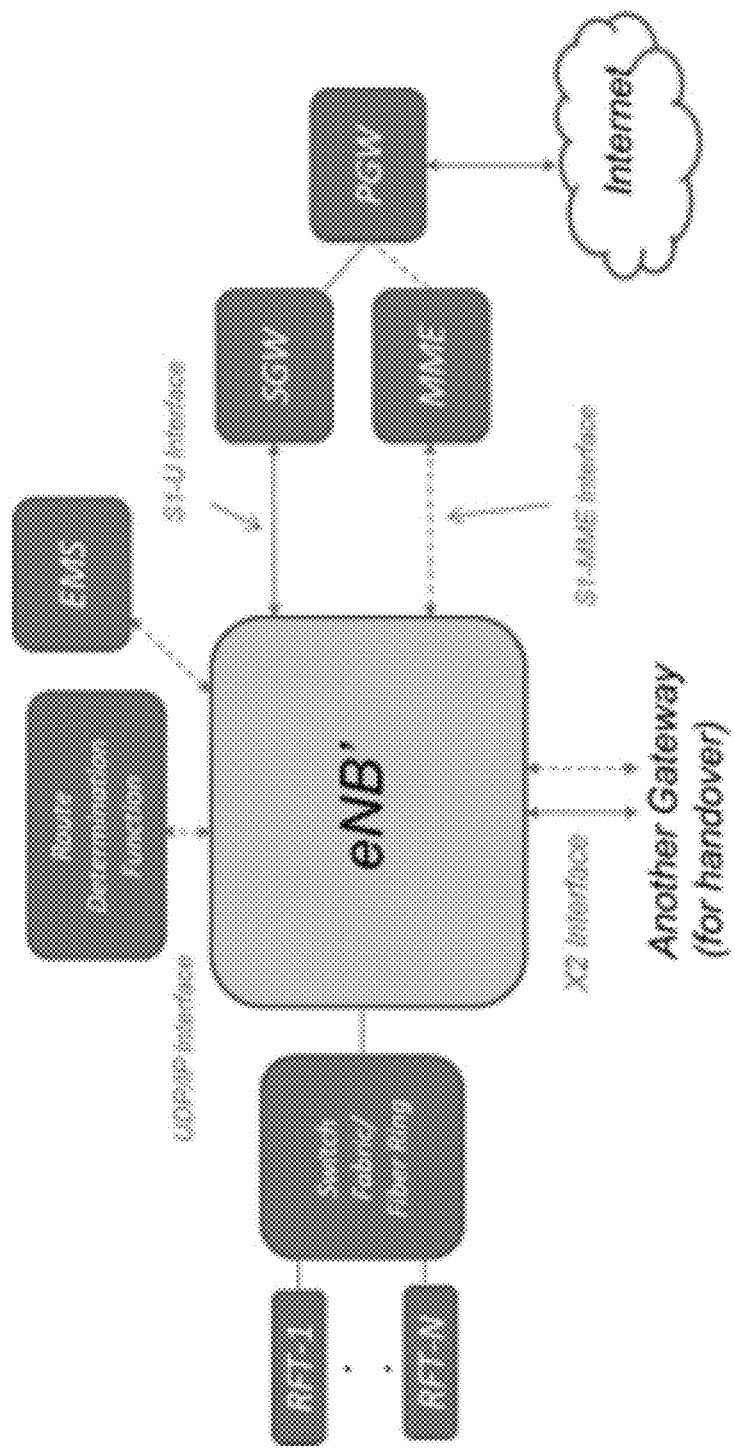
FIG. 17B illustrates interfaces to an e-node B function of a gateway, according to example embodiments.

FIG. 17B illustrates interfaces to an e-node B function of a gateway, according to example embodiments. The gateway tracking antennas may be steerable antennas or phased array antennas. For the case of phased array antennas, it is possible to have a single large array of antenna elements that form multiple beams tracking multiple satellites.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A satellite communications system comprising:
   one or more low earth orbit (LEO) processing satellites;
   one or more medium earth orbit (MEO) processing satellites;
   one or more satellite gateways (SGWs), each including a respective eNodeB;
   a plurality of user terminals (UTs);
   a control plane protocol architecture comprising physical (PHY), media access control (MAC), MAC radio link control (MAC/RLC) and radio resource control (RRC) layers that are optimized for a satellite environment, and
   wherein, with regard to control plane communications between a one of the UTs and a one of the LEO processing satellites or MEO processing satellites, which is the communicating LEO/MEO satellite, and between the communicating LEO/MEO satellite and a one of the SGWs, which is the communicating SGW,
   the PHY layer is provided by a user-link of the communicating LEO/MEO satellite,
   the MAC/RLC and RRC layers, and a packet data control plane (PDCP) layer, are implemented in the communicating LEO/MEO satellite when the system facilitates mesh communications between the one UT and one or more other of the UTs, and implemented in the communicating SGW when the system does not facilitate mesh communications between the one UT and one or more other of the UTs, and
   when the RRC is implemented in the communicating LEO/MEO satellite, the RRC is divided into RRC- Lower (RRC-L) and RRC-Upper (RRC-U) layers, wherein the RRC-L is implemented in the communicating LEO/MEO satellite and is responsible for handover signaling with the one UT, and the RRC-U is implemented in the eNodeB of the communicating SGW and is responsible for resource management functions including admission control, and wherein the RRC-U communicates with the PDCP layer in the eNodeB of the communicating SGW to configure security, header compression and data compression schemes, and wherein, with regard to user plane communications between the one UT and the communicating LEO/MEO satellite, and between the communicating LEO/MEO satellite and a destination server via the communicating SGW, returnlink physical and logical channels include a returnlink packet data channel (PDCH) comprising a returnlink transport packet data traffic channel (PDTCH) logical channel and uplink control messages, and include a transport random access channel (transport RACH), and forwardlink physical and logical channels include a forwardlink PDCH comprising a forwardlink PDTCH logical channel and downlink control messages, and include a forwardlink packet control channel (PCCH) comprising a broadcast channel, a paging channel, an access grant channel and a packet data control channel (PDCCH).

* * * * *